United States Patent
Aiba et al.

(10) Patent No.: US 10,946,573 B2
(45) Date of Patent: Mar. 16, 2021

(54) CASSETTE MOLD TYPE INJECTION MOLDING MACHINE

(71) Applicant: SODICK CO., LTD., Kanagawa (JP)

(72) Inventors: Shuji Aiba, Kanagawa (JP); Shigeru Takakura, Kanagawa (JP); Yasuhiro Kitamura, Kanagawa (JP); Kenzo Akiyama, Kanagawa (JP)

(73) Assignee: SODICKCO., LTD., Kanagawa (JP)

( * ) Notice: Subject to any disclaimer, the term of this patent is extended or adjusted under 35 U.S.C. 154(b) by 528 days.

(21) Appl. No.: 15/807,575

(22) Filed: Nov. 9, 2017

(65) Prior Publication Data

US 2018/0133943 A1     May 17, 2018

(30) Foreign Application Priority Data

Nov. 16, 2016  (JP) .............................. JP2016-222851

(51) Int. Cl.
*B29C 45/73* (2006.01)
*B29C 45/26* (2006.01)
*B29C 45/78* (2006.01)

(52) U.S. Cl.
CPC ...... *B29C 45/7306* (2013.01); *B29C 45/2673* (2013.01); *B29C 45/78* (2013.01); *B29C 2945/76531* (2013.01)

(58) Field of Classification Search
CPC ................................................ B29C 45/2673
See application file for complete search history.

(56) References Cited

U.S. PATENT DOCUMENTS

| 5,249,947 A | 10/1993 | Inaba et al. | |
| 2007/0286918 A1* | 12/2007 | Crain | B29C 33/74 425/175 |
| 2010/0187709 A1* | 7/2010 | Wang | B29C 35/007 264/40.6 |
| 2012/0241125 A1* | 9/2012 | Hattori | B29C 45/7306 165/11.1 |

FOREIGN PATENT DOCUMENTS

| JP | H04086225 | 3/1992 |
| JP | H04301425 | 10/1992 |
| JP | 2013123900 | 6/2013 |
| JP | 2013123900 A * | 6/2013 |

OTHER PUBLICATIONS

Translation of JP-2013123900.*

* cited by examiner

*Primary Examiner* — Marc C Howell
*Assistant Examiner* — Asha A Thomas
(74) *Attorney, Agent, or Firm* — JCIPRNET

(57) ABSTRACT

The cassette mold type injection molding machine controls a first temperature control circuit to supply a heat medium having a heating temperature from a first heating device to a matrix supply path, controls a second temperature control circuit to supply the heat medium having a cooling temperature from a second heating device to the core cavity supply path, and performs cassette mold cool down control in which a bypass control valve is controlled to connect a bypass path and a main body supply path, such that a second heating device or a core cavity supply path is connected to a main body supply path, and thus the heat medium having the heating temperature is supplied to the matrix and the heat medium having the cooling temperature is supplied to a cassette mold main body and a core cavity portion.

3 Claims, 13 Drawing Sheets

CASSETTE MOLD TYPE INJECTION MOLDING MACHINE

CROSS-REFERENCE TO RELATED APPLICATION

This application claims the priority benefit of Japanese application serial no. 2016-222851, filed on Nov. 16, 2016. The entirety of the above-mentioned patent application is hereby incorporated by reference herein and made a part of this specification.

BACKGROUND OF THE DISCLOSURE

Field of the Disclosure

The disclosure relates to a cassette mold type injection molding machine which performs injection molding using a cassette mold installed at a matrix.

Description of Related Art

An injection molding machine is a machine in which a molded article is obtained by injecting a material which is melted while being heated and plasticized into a mold and then solidifying it by cooling. Injection molding materials include resins, metals, or composite materials thereof.

In general, injection molding is carried out in the order of, for example, mold closing and clamping, metering, injecting, dwelling, cooling, mold opening and ejecting, and products are continuously produced by repeating this molding cycle. In order to adjust a temperature of the mold to a temperature necessary for each process such as molding, a temperature control circuit of the injection molding machine is controlled to supply a heat medium of a desired temperature to a path provided in the mold. Patent Document 1 discloses an injection molding machine in which temperature control of a mold is performed by a plurality of temperature control circuits.

In the injection molding machine, after performance of the predetermined number of molding cycles, it is necessary to perform mold replacement in which the mold is removed and a new mold is installed for a next molding cycle. In the mold replacement, it is necessary to cool the mold to a cooling temperature which facilitates work and to discharge the heat medium from the mold before removing the mold, and thus it takes time to replace the mold.

Here, as a mold which does not need to be entirely replaced during the mold replacement, a cassette type mold having a cassette mold which forms a molding space corresponding to a shape of a molded article and a matrix at which the cassette mold is removably installed is known (refer to Patent Document 2). When the cassette type mold is used, while the matrix is installed at the injection molding machine, the cassette mold is removed from the matrix, a new cassette mold is then installed in the matrix, and thus the mold replacement for a next molded article is performed.

PRIOR ART DOCUMENT

Patent Documents

[Patent Document 1] Japanese Unexamined Patent Application Publication No. H4-301425

[Patent Document 2] Japanese Unexamined Patent Application Publication No. H4-86225

SUMMARY OF THE DISCLOSURE

However, in Patent Document 2, since a heat medium path is not provided in the cassette mold, it is configured to control the temperature of the cassette mold via the matrix by passing the heat medium through the heat medium path provided in the matrix. Therefore, in Patent Document 2, in order to replace the cassette mold, it is necessary to cool the cassette mold installed at the matrix by passing the heat medium having a cooling temperature through the heat medium path in the matrix, and thus a cool down time to cool the cassette mold to a temperature at which the cassette mold can be removed is not sufficiently shortened.

Further, in the injection molding machine having a plurality of temperature control circuits, a cassette mold type injection molding machine in which the cassette mold includes a core portion and a cavity portion which form a molding space corresponding to a shape of a molded article and other cassette mold main bodies and two temperature control circuits are provided to have a combination of, for example, a first temperature control circuit for adjusting a temperature of the matrix and the cassette mold main bodies and a second temperature control circuit for adjusting a temperature of the core portion and the cavity portion may be required. Even in the cassette mold type injection molding machine having two such temperature control circuits, it is desirable to shorten the cool down time of the cassette mold.

In view of the above-mentioned requirement, the disclosure is to shorten a time for cooling down a cassette mold in an injection molding machine having two temperature control circuits including a combination of, for example, a first temperature control circuit for a matrix and a cassette mold main body portion and a second temperature control circuit for a core portion and a cavity portion. Advantages of the disclosure will be set forth in the description that follows.

Provided is a cassette mold type injection molding machine of the disclosure including a cassette mold and a matrix in which the cassette mold is removably installed, the cassette mold performing injection molding using a mold having a core cavity portion configured with a core portion and a cavity portion forming a molding space corresponding to a shape of a desired molded article, and a cassette mold main body which is a portion excluding the core portion and the cavity portion from the cassette mold, the cassette mold type injection molding machine including a first temperature control circuit having a first heating device which maintains a heat medium at a heating temperature, a matrix supply path which supplies the heat medium from the first heating device to the matrix, and a main body supply path which supplies the heat medium having the heating temperature from the first heating device to the cassette mold main body, a second temperature control circuit having a second heating device which maintains the heat medium at a cooling temperature or the heating temperature, and a core cavity supply path which supplies the heat medium from the second heating device to the core cavity portion, a bypass circuit having a bypass path which connects the second heating device or the core cavity supply path with the main body supply path, and a bypass control valve which switches connection between the first heating device and the main body supply path and connection between the bypass path and the main body supply path, and a control portion configured to control the first temperature control circuit to supply the heat medium having the heating temperature from the first heating device to the matrix supply path, to control the second temperature control circuit to supply the heat medium having the cooling temperature from the second heating device to the core cavity supply path, and to perform cassette mold cool down control in which the bypass control valve is controlled to connect the bypass path and the main body supply path and thus the heat medium having the cooling temperature is supplied to the cassette mold main body and the core cavity portion to cool the cassette mold main body and the core cavity portion while the heat medium having the heating temperature is supplied to the matrix to maintain the matrix at the heating temperature, when the cassette mold is replaced.

According to the disclosure, it is possible to independently cool the cassette mold having the cassette mold main body and the core cavity portion while maintaining the matrix at the heating temperature. Therefore, it is possible to shorten the time for cooling the cassette mold to the replaceable temperature, as compared with the case in which both of the matrix and the cassette mold are cooled. In addition, since it is not necessary to temporarily cool and then reheat the matrix when replacing the cassette mold, it is possible to save energy and to reduce a time required for heating the mold to a moldable temperature after the replacement of the cassette mold.

DESCRIPTION OF THE EMBODIMENTS

Figure 1:
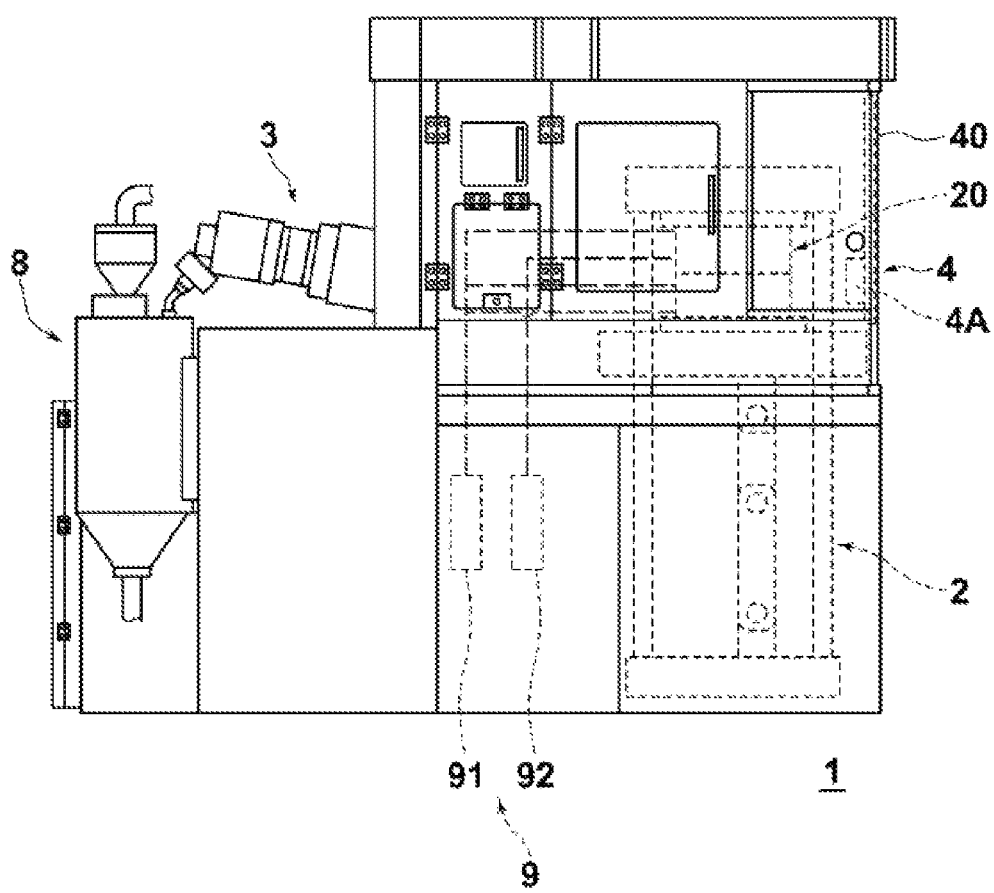
FIG. 1 is a schematic configuration diagram of an injection molding machine according to one embodiment of the disclosure.

Hereinafter, embodiments of the disclosure will be described with reference to the drawings. FIG. 1 is a schematic configuration diagram of an injection molding machine 1 according to one embodiment of the disclosure.

The injection molding machine 1 of the disclosure includes a mold clamping device 2, an injection device 3, a drying part 8 which dries a molding material, a mold temperature control circuit 9 which will be described later and has first and second temperature control circuits 91 and 92 for controlling a temperature of a mold 20 installed at the mold clamping device 2, and so on, and a control device 4 which controls each device. The control device 4 has an operation panel unit 40 (operation device) including a touch panel type display (touch sensor and display part) of the injection molding machine 1 which is installed at an outside of a casing of the injection molding machine 1, and a main body 4A of the control device is provided on a rear surface of the operation panel unit 40 in the casing of the injection molding machine 1. Further, the drying part 8 is connected to a hopper (not illustrated) installed at the injection device 3 through a supply pipe (not illustrated) and is configured to supply the dried molding material to the injection device 3 by a conveying device (not illustrated).

Figure 2:
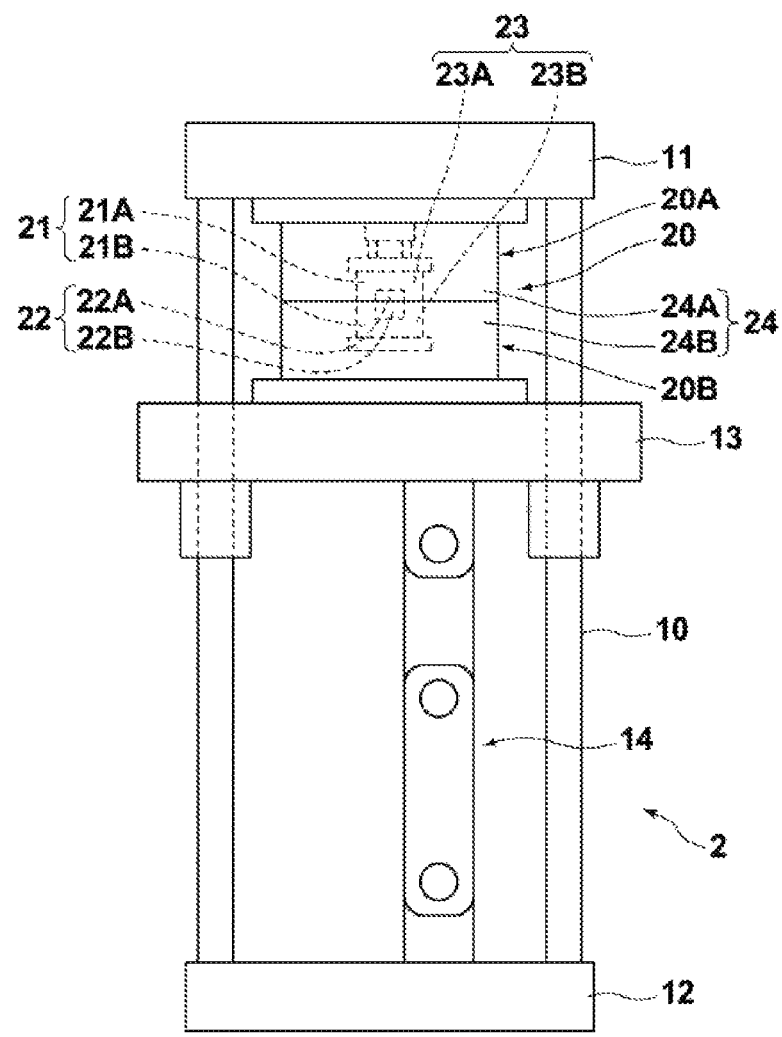
FIG. 2 is a schematic view of a mold closed state of a mold clamping device according to one embodiment of the disclosure.
Figure 3:
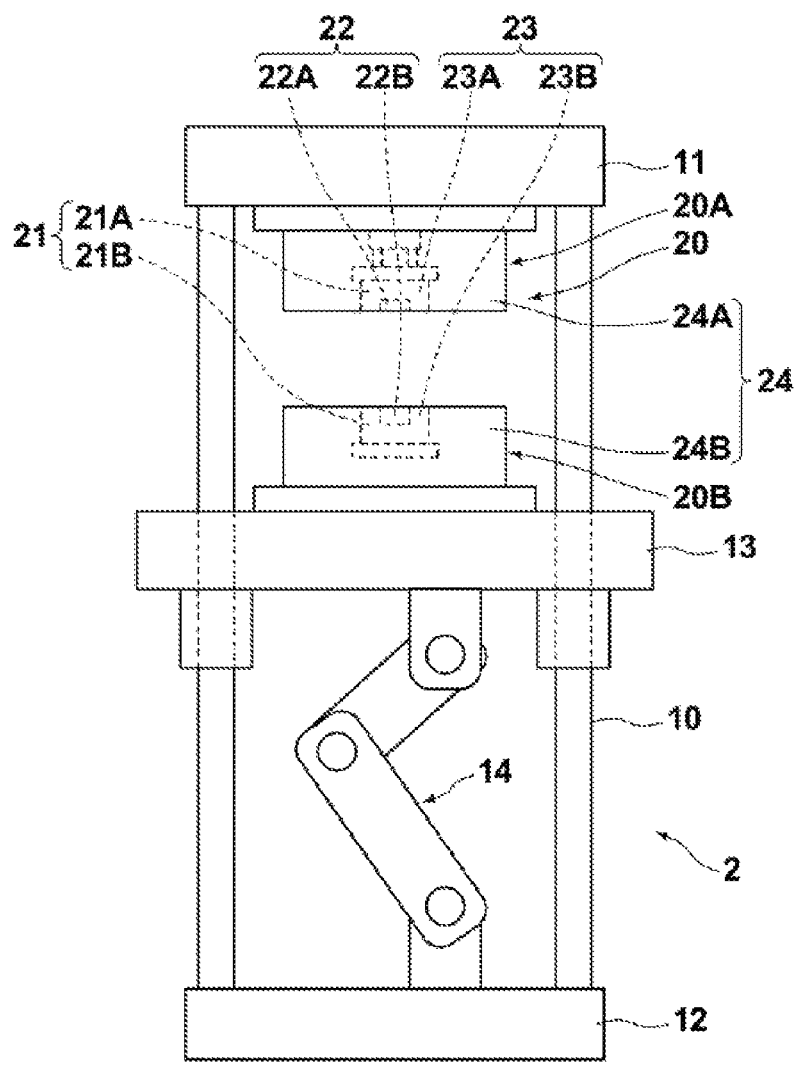
FIG. 3 is a schematic view of a mold open state of the mold clamping device of FIG. 2.
Figure 4:
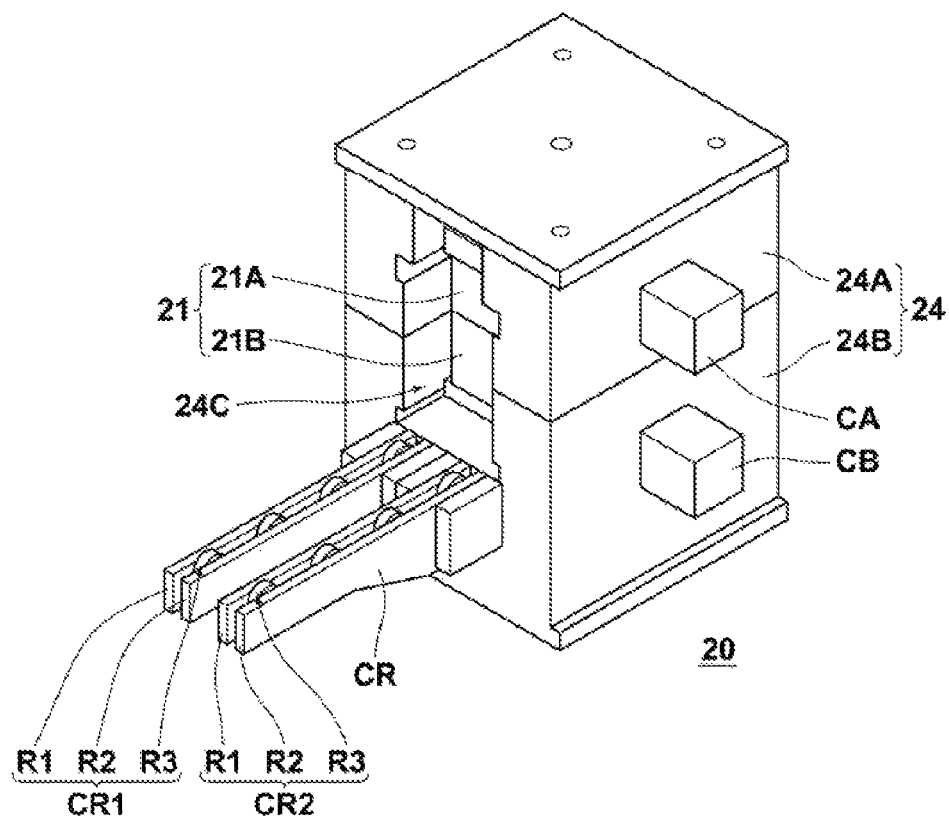
FIG. 4 is a perspective view illustrating a mold in a state in which a cassette mold is disposed at an installation position.
Figure 5:
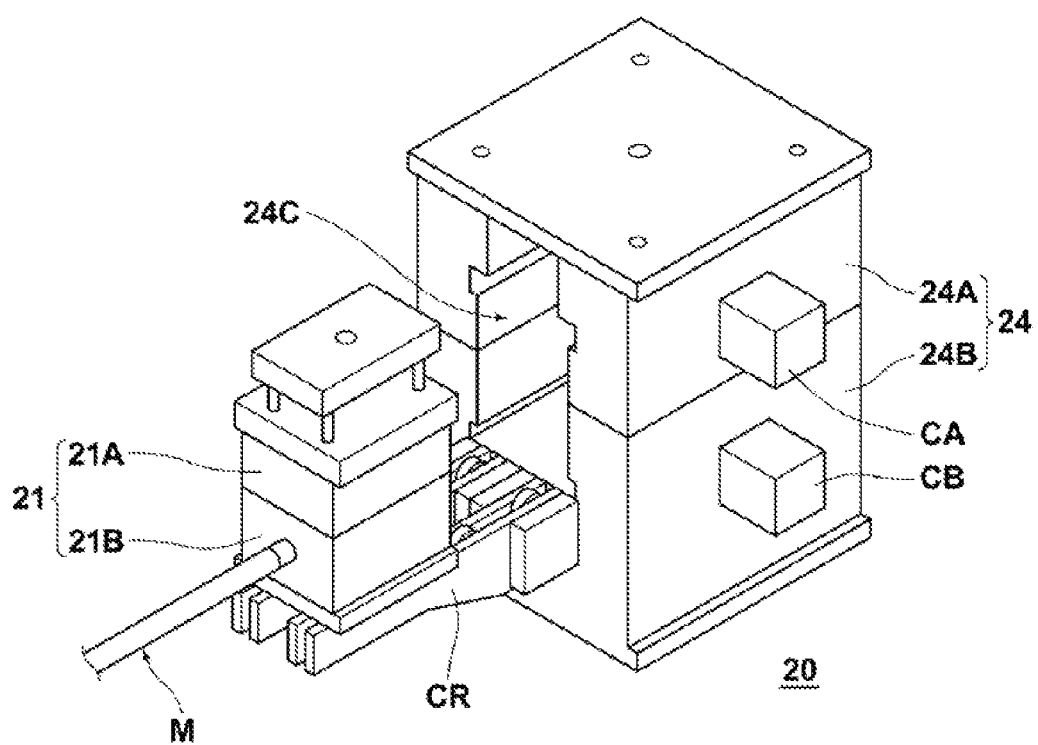
FIG. 5 is a perspective view illustrating the mold in a state in which the cassette mold is disposed at a replacement position.

The mold clamping device 2 and the mold 20 will be described using FIGS. 2, 3, 4 and 5. FIG. 2 is a schematic view illustrating the mold 20 and the mold clamping device 2 in a mold closed state, and FIG. 3 is a schematic view illustrating the mold 20 and the mold clamping device 2 in a mold open state. FIG. 4 is an external view of the mold 20 in a state in which a cassette mold 21 is disposed at an installation position inside a matrix 24, and FIG. 5 is an external view of the mold 20 in a state in which the cassette mold 21 is disposed at a replacement position outside the matrix 24.

As illustrated in FIGS. 2 and 3, the mold clamping device 2 has a mechanism for opening and closing the mold 20 and also has a mechanism for applying a sufficient pressure (mold clamping force) against a pressure when the mold is filled with a resin material. When the mold clamping force is applied, the mold is able to endure the pressure when the molten resin material enters the mold, and thus the resin material does not leak out of the mold.

The mold clamping device 2 includes a movable platen 11 and a back platen 12 which are connected by a tie bar 10, a fixed platen 13 which is arranged between the platens and fixed to a machine base (not illustrated), and a driving device 14 which presses the fixed platen 13 by advancing and retreating it with respect to the movable platen 11. A movable side mold 20A of the mold 20 is installed at the movable platen 11, and a fixed side mold 20B of the mold 20 is installed at the fixed platen 13. The installation of the mold 20 is performed by clamping and fixing the mold 20 to the movable platen 11 side or the fixed platen 13 side by a plurality of mold installation members. The driving device 14 is a device which advances and retreats the movable platen 11 together with the movable side mold 20A to open and close the mold and performs mold clamping by pressing, and here, a single toggle type mold clamping device is adopted. As the driving device 14, there are, for example, an electrically driven, hydraulically driven or electro-hydraulically driven direct pressure type clamping device in which mold opening and closing is electrically driven and clamping is hydraulically driven, a toggle type mold clamping device, and so on. The injection device 3 which plasticizes and injects the molding material is provided on the machine base and is disposed on a side surface side of the mold 20.

The movable platen 11 and the fixed platen 13 are installed so that mold installation surfaces thereof facing each other maintain high-precision parallelism. For example, the movable platen 11 and a back platen 12 which advance and retreat with respect to the fixed platen 13 are guided by passing the tie bar 10 through a linear bush provided at four corners of the fixed platen 13.

A hole (not illustrated) through which an ejector rod of a protrusion device (not illustrated) passes is formed at a center position or a predetermined position of the movable platen 11. The protrusion device (not illustrated) is mounted on the movable platen 11.

The mold 20 includes the cassette mold 21 and the matrix 24 at which the cassette mold 21 is removably installed. The cassette mold 21 has a movable side cassette mold 21A and a fixed side cassette mold 21B. The matrix 24 has a movable side matrix 24A at which the movable side cassette mold 21A is removably installed and a fixed side matrix 24B at which the fixed side cassette mold 21B is removably installed. The movable side mold 20A is configured with the movable side cassette mold 21A and the movable side matrix 24A, and the fixed side mold 20B is configured with the fixed side cassette mold 21B and the fixed side matrix 24B.

The cassette mold 21 includes a core cavity portion 22 including a core portion 22A and a cavity portion 22B which form a molding space having a shape corresponding to a desired molded article, and a cassette mold main body 23 which is a portion excluding the core cavity portion 22 from the cassette mold 21.

Here, the movable side cassette mold 21A has the core portion 22A and a movable side cassette mold main body 23A which is a portion of the movable side cassette mold 21A other than the core portion 22A. The fixed side cassette mold 21B has the cavity portion 22B and a fixed side cassette mold main body 23B which is a portion of the fixed side cassette mold 21B other than the cavity portion 22B. In addition, the cassette mold main body 23 is configured with the movable side cassette mold main body 23A and the fixed side cassette mold main body 23B.

Further, the cassette mold 21 is appropriately configured according to a molded article or the like so that one of the movable side cassette mold 21A and the fixed side cassette mold 21B has a core portion and the other one of the movable side cassette mold 21A and the fixed side cassette mold 21B has the cavity portion. When the movable side cassette mold 21A has the cavity portion, a portion of the movable side cassette mold 21A other than the cavity portion becomes the movable side cassette mold main body 23A, and when the fixed side cassette mold 21B has the core portion, a portion of the fixed side cassette mold 21B other than the core portion becomes the fixed side cassette mold main body 23B.

As illustrated in FIGS. 4 and 5, the movable side matrix 24A has a clamping means CA for removably holding the movable side cassette mold 21A, and the fixed side matrix 24B has a clamping means CB for removably holding the fixed side cassette mold 21B. As illustrated in FIGS. 2 and 3, in a series of processes of closing the mold, injecting and then removing an article, the movable side mold 20A integrally moves in a state in which the movable side cassette mold 21A is held in the movable side matrix 24A by the clamping means CA, and the fixed side mold 20B integrally stopped in a state in which the fixed side cassette mold 21B is held in the fixed side matrix 24B by the clamping means CB.

Here, the movable side matrix 24A has an air clamp type clamp cylinder mechanism as the clamping means CA. By driving the clamping means CA and pressing a pressing member (not illustrated) of the clamping means CA against the movable side cassette mold 21A, the movable side cassette mold 21A is held (clamped) in the movable side matrix 24A, and by separating the pressing member from the movable side cassette mold 21A, the movable side cassette mold 21A is released (unclamped) from the movable side matrix 24A. The fixed side matrix 24B has the clamping means CB similar to the clamping means CA and performs holding and releasing between the fixed side matrix 24B and the fixed side cassette mold 21B in the same manner as holding and releasing between the movable side matrix 24A and the movable side cassette mold 21A. The disclosure is not limited to this embodiment, and various types of clamping means can be employed as long as the required functions can be realized.

Further, as a transport path of the cassette mold 21, a cassette rail CR extending outward from a lower end of an opening 24C for a cassette mold gateway of the matrix 24 is installed at the matrix 24. The cassette rail CR is configured with a pair of parallel rails CR1 and CR2, and each of the rails CR1 and CR2 has a pair of parallel support plates R1 and R3 facing each other, and a conveying portion R2 installed at upper ends of the support plates R1 and R3. The conveying portion R2 includes a rotational shaft (not illustrated) of which both ends are supported by the support plates R1 and R3 in parallel with a normal direction of the support plates R1 and R3 and a member which rotates around the rotational shaft, and the rotating member is in contact with a lower surface of the cassette mold 21 and supports the cassette mold 21 to be easily moved forward and backward in an extending direction of the cassette rail CR.

Further, the injection molding machine 1 includes a mold moving means for moving the cassette mold 21 from the replacement position outside the matrix 24 to the installation position inside the matrix 24 and then installing the cassette mold 21; and moving the cassette mold 21 from the installation position inside the matrix 24 to the replacement position outside the matrix 24 and then removing the cassette mold 21. The mold moving means is configured with a driving means (not illustrated) such as a cylinder mechanism (not illustrated) having a rod M and a piston to which the rod M is fixed. The mold moving means locks a tip end of the rod M to a locking portion (not illustrated) provided on a surface close to a removal port side of the cassette mold 21 by the driving means (not illustrated) and then advances and retracts the rod M in a forward and backward direction in this state, and thus the cassette mold is moved between the installation position inside the matrix 24 and the replacement position outside the matrix 24. Further, various types of driving sources such as an electric type, a hydraulic type, a pneumatic type or the like can be used as the driving means.

Further, the mold moving means may have any configuration in which the cassette mold 21 is moved from the replacement position outside the matrix 24 to the installation position inside the matrix 24 and then installed the cassette mold 21; and the cassette mold 21 is moved from the installation position inside the matrix 24 to the replacement position outside the matrix 24 and then removed the cassette mold 21. For example, a moving robot having a gripping portion for gripping a removal lever of the cassette mold 21, a driving portion for moving the moving robot between the installation position inside the matrix and the replacement position outside the matrix, and a control portion which is provided at the gripping portion to control gripping and releasing of the removal lever and to perform position control of the moving robot by the driving portion may be included.

Also, the mold moving means is not an essential component. For example, the mold moving means may be omitted, and the operator may manually install and remove the cassette mold 21.

Figure 6:
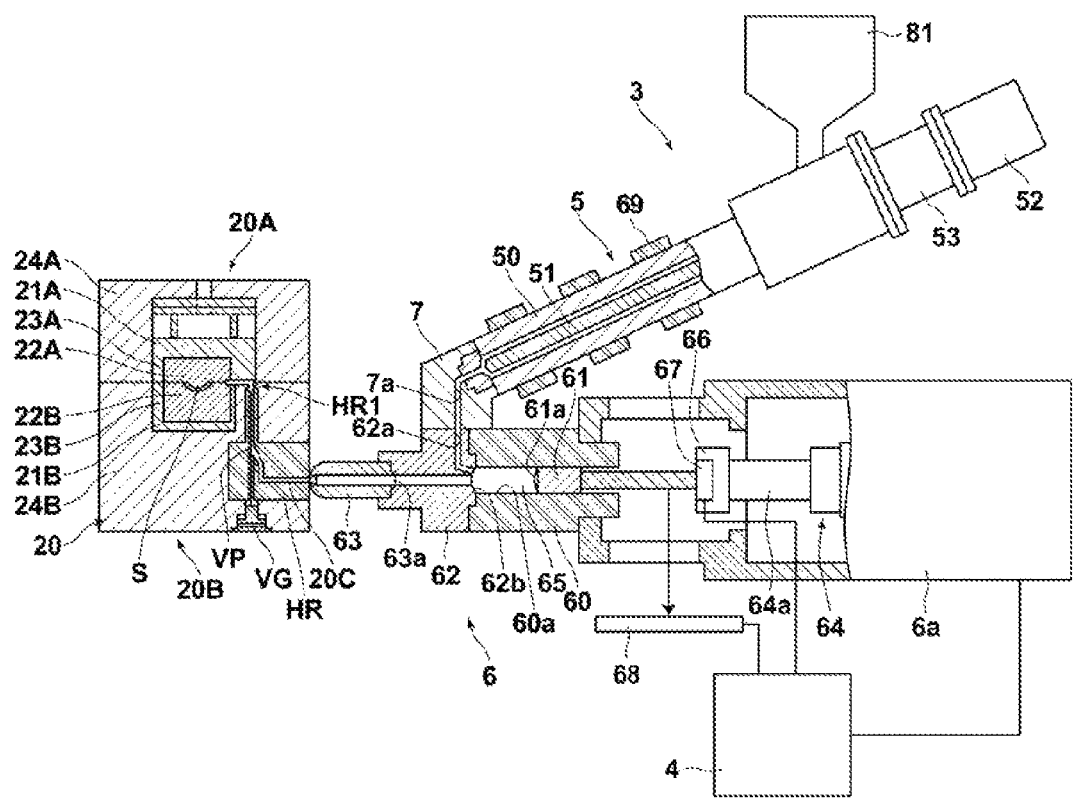
FIG. 6 is a schematic view of the injection molding machine of FIG. 1.

FIG. 6 is a schematic view of the injection device 3. The injection device 3 plasticizes and melts the resin material while heating it, and the molten resin is injected at a high pressure and fills a molding space S having a shape corresponding to a molded article in the mold 20 mounted in the mold clamping device 2, and the molded article is obtained by cooling and solidifying the molten resin in the molding space. Here, the injection device 3 is a screw pre-plastic type injection device for injection molding a thermoplastic resin material. The disclosure is not limited thereto, and the injection device 3 may be an in-line screw type injection device in which a resin material is plasticized and melted by one in-line screw and the molten resin is injected and filled.

In the injection device 3, a plasticizing unit 5 for plasticizing and melting a resin material and an injection unit 6 for injecting and filling the molten resin toward the molding space in the mold 20 are separately provided and connected by a junction 7 having a communication path 7a.

The plasticizing unit 5 includes a plasticization cylinder 50, a screw 51 in the plasticization cylinder 50, a rotary driving device 52 for rotating the screw 51, and a backflow prevention driving device 53 for slightly advancing and retreating the screw 51. A hopper 81 is provided to supply the resin material from a rear end side of the plasticization cylinder 50.

The injection unit 6 includes an injection cylinder 60, a plunger 61 located in an injection cylinder hole 60a of the injection cylinder 60, an injection driving device 64 which advances and retreats the plunger 61, a main body portion 6a in which the injection driving device 64 is included and at which the injection cylinder 60 is installed, and an injection nozzle 63 which is installed at a front end of the injection cylinder 60 via a nozzle cylinder 62. A front wall 62b having approximately the same shape as that of a front end surface 61a of the plunger 61 is formed on an end surface of the nozzle cylinder 62 on the injection cylinder 60 side. An injection chamber 65 is formed as a space surrounded by the front wall 62b, the injection cylinder hole 60a of the injection cylinder 60 and the front end surface 61a of the plunger 61. Additionally, a communication path 62a communicating with an inside of the plasticization cylinder 50 through the communication path 7a of the junction 7 or an injection hole 63a communicating with a tip end of the injection nozzle 63 is opened in the injection chamber 65. A coupling 66 connects the plunger 61 with a driving rod 64a of the injection driving device 64.

Further, the injection unit 6 has a linear scale 68 as a position detection device for detecting a position of the injection driving device 64 and also has a load cell 67 as a pressure detection device between a rear end of the plunger 61 and a front end of the driving rod 64a of the injection driving device 64. Also, when the injection driving device 64 is a motor, the position detection device may calculate the position from a rotational speed detected by a rotary encoder. For example, an actual measured value of the speed can be obtained by converting position information sequentially detected from the position detection device into speed information with reference to a reference clock of a calculation device. Also, the pressure detection device may be configured to detect a pressure of an oil chamber on a side in which the plunger 61 is advanced when the injection driving device 64 is a hydraulic cylinder, or may be configured to calculate from an input current or a rotational torque of a motor detected by a current measuring device or a torque measuring device when the injection driving device 64 is the motor.

The tip of the injection nozzle 63 is connected to a material supply path 20C provided in the mold 20 so that the molding material can be supplied from the injection nozzle 63 to the molding space S formed by the core portion 22A and the cavity portion 22B. The material supply path 20C of the mold 20 is configured by communicating the material supply path formed by a valve gate type hot runner nozzle HR in the matrix 24, the material supply path in the cassette mold main body 23 and the material supply path in the core portion 22A and/or the cavity portion 22B.

The valve gate type hot runner nozzle HR has a material supply path, a heater (not illustrated) and a valve gate system VG. The material supply path in the hot runner nozzle HR is heated by the heater to maintain a molten state of the molten resin remaining in the path. A valve pin VP extending toward an opening HR1 which opens along the material supply path 20C to a tip end (tip end on a downstream side) of the hot runner nozzle HR is installed at the valve gate system VG, and the molten resin passes through a gap between an inner circumferential surface of the material supply path and an outer circumferential surface of the valve pin VP. The valve gate system VG opens and closes the opening HR1 by inserting and removing a tip end of the valve pin VP. The valve pin VP is driven forward and backward by various types of driving sources such as an electric type, a pneumatic type or a hydraulic type. The opening HR 1 located at the tip end of the material supply path of the valve gate type hot runner nozzle HR is closed when the valve pin VP moves forward and is opened to communicate with the material supply path in the core portion 22A and/or the cavity portion 22B when the valve pin VP moves backward. Further, an open gate type in which the opening HR1 opening to the tip end is always open may be employed as the hot runner nozzle HR.

The various types of driving devices of the injection unit 6 are appropriately constituted by a hydraulic type, a pneumatic type or an electric type. A heating device 69 (hereinafter, simply referred to as a heater) such as a band heater is provided on outer circumferences of the plasticization cylinder 50, the injection cylinder 60, the nozzle cylinder 62, the junction 7, the injection nozzle 63, and so on. For example, each cylinder is divided into a plurality of zones in an axial direction such as a tip end portion, an intermediate portion and a rear end portion, and the heater 69 is wound around each of the portions. The heater 69 is also wound around the injection nozzle 63. FIG. 3 illustrates a state in which the heater 69 is wound around the plasticization cylinder 50 for convenience, but the heater 69 may also be wound around the injection cylinder 60, the nozzle cylinder 62, the junction 7 and the injection nozzle 63.

Figure 7:
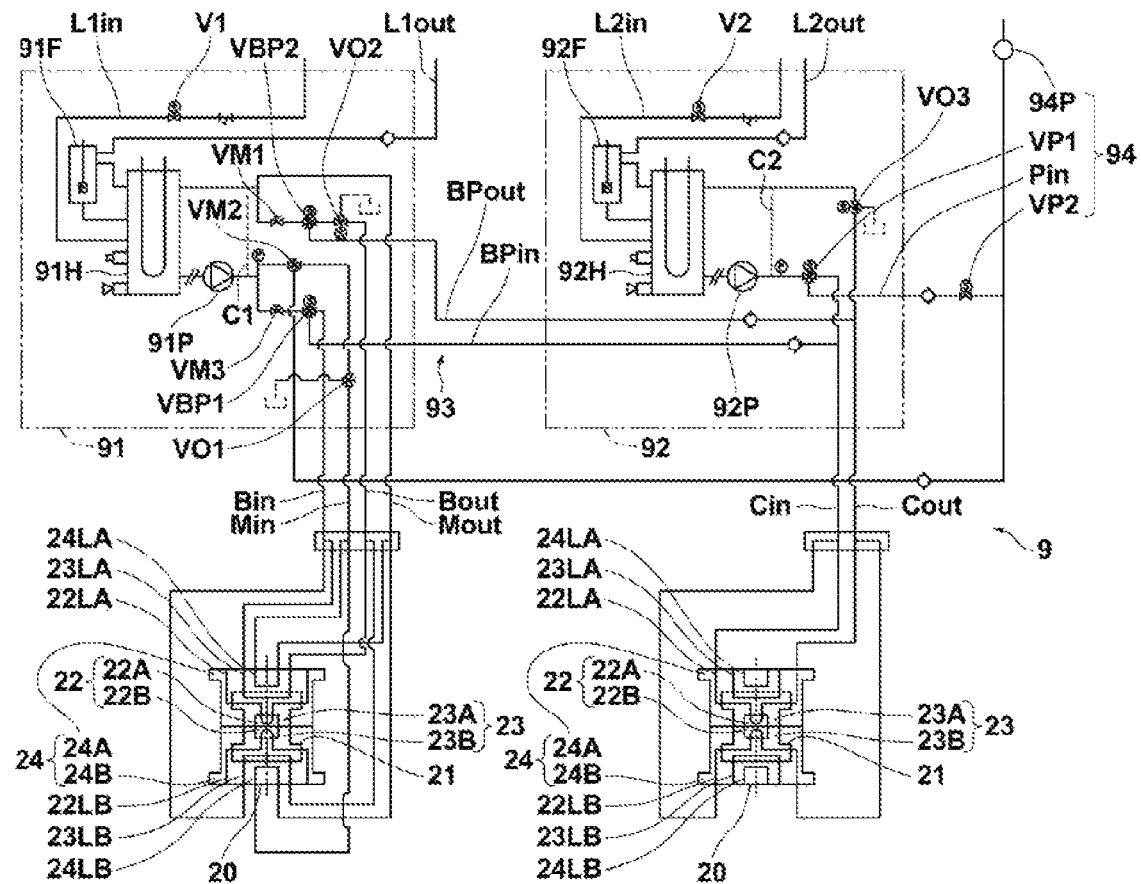
FIG. 7 is a schematic view illustrating a circuit configuration of a mold temperature control circuit of the injection molding machine according to one embodiment of the disclosure.

FIG. 7 is a schematic view illustrating a circuit configuration of the mold temperature control circuit 9. The mold temperature control circuit 9 serves to supply a heat medium or compressed gas to the mold 20 for temperature control or purging of the mold 20. In the embodiment, water is used as the heat medium, and compressed air is used as the compressed gas for the purge, that is, for discharging the heat medium. The heat medium may be appropriately selected from an arbitrary liquid, and the compressed gas may be appropriately selected from an arbitrary gas.

The mold temperature control circuit 9 has first and second temperature control circuits 91 and 92, a mold 20 and a bypass circuit 93 which supply the heat medium to the mold 20. Furthermore, the injection molding machine 1 has a purge circuit 94 for supplying the compressed gas to the mold 20.

First, a medium path which is provided in the mold 20 and through which the heat medium or the compressed gas passes will be described, and then each circuit of the mold temperature control circuit 9 will be described. In FIG. 7 (and FIGS. 9 to 11 which will be described later), in order to prevent connection between the first and second temperature control circuits 91 and 92 and the medium path in the mold 20 from being invisible, the medium path in one mold 20 is illustrated to be divided into two figures (lower left and lower right in FIGS. 7 and 9 to 11), a circuit portion connected to the matrix 24 and the cassette mold main body 23 is illustrated in a lower left mold 20 and a circuit part connected to the core cavity portion 22 is illustrated in the lower right mold 20.

The mold 20 includes a movable side matrix path 24LA for controlling a temperature of the movable side matrix 24A, a fixed side matrix path 24LB for controlling a temperature of the fixed side matrix 24B, a movable side body path 23LA for controlling a temperature of the movable side cassette mold main body 23A, a fixed side body path 23LB for controlling a temperature of the fixed side cassette mold main body 23B, a core portion path 22LA for controlling a temperature of the core portion 22A, and a cavity portion path 22LB for controlling a temperature of the cavity portion 22B.

The movable side body path 23LA is configured to be connected to pipelines provided in the movable side matrix 24A and the movable side cassette mold main body 23A, such that the movable side cassette mold 21A communicates with the movable side matrix 24A in a clamped state. The core portion path 22LA is configured to be connected to pipelines provided for the movable side matrix 24A, the movable side cassette mold main body 23A and the core portion 22A, such that the movable side cassette mold 21A communicates with the movable side matrix 24A in the clamped state. The fixed side body path 23LB is configured be connected to pipelines provided in the fixed side matrix 24B and the fixed side cassette mold main body 23B, such that the fixed side cassette mold 21B communicates with the fixed side matrix 24B in a clamped state. The cavity portion path 22LB is configured to be connected to pipelines provided for the fixed side matrix 24B, the fixed side cassette mold main body 23B and the cavity portion 22B, such that the fixed side cassette mold 21B communicates with the fixed side matrix 24B in the clamped state.

The medium path in the mold 20 is constituted to be branched and merged along the way in accordance with the molded article or the like, if necessary, and an appropriate number of paths are arranged on appropriate routes. Here, the medium path in the mold 20 is constituted so that each of the paths 24LA, 24LB, 23LA, 23LB, 22LA and 22LB is arranged in one plane passing through a center of the mold 20 and traversing the movable side mold and the fixed side mold.

The first temperature control circuit 91 includes a first heating device 91H which is controlled by a temperature adjustment control portion 46 and maintains the temporarily stored heat medium at a predetermined heating temperature, a pump 91P which is controlled by the temperature adjustment control portion 46 to feed the heat medium from the first heating device 91H at a predetermined flow rate, a matrix supply path Min which supplies the heat medium delivered from the first heating device 91H by the pump 91P to the matrix 24, and a main body supply path Bin which supplies the heat medium delivered from the first heating device 91H by the pump 91P to the cassette mold main body 23. Further, the first temperature control circuit 91 includes a matrix discharge path Mout which returns the heat medium discharged from the matrix 24 to the first heating device 91H and a main body discharge path Bout which returns the heat medium discharged from the cassette mold main body 23 to the first heating device 91H. The matrix 24, the first heating device 91H, the matrix supply path Min and the matrix discharge path Mout are connected to supply the heat medium discharged from the matrix 24 to the matrix 24 again, such that the heat medium can circulate. The cassette mold main body 23, the first heating device 91H, the main body supply path Bin and the main body discharge path Bout are connected to supply the medium discharged from the cassette mold main body 23 to the cassette mold main body 23 again and is connected, such that the medium can circulate.

Further, the first temperature control circuit 91 may have a connection path C1 which connects the matrix supply path Min and the matrix discharge path Mout for the purpose of releasing some of the heat medium to the matrix discharge path Mout and lowering a pressure when the heat medium in the matrix supply path Min exceeds a predetermined pressure. Also, the first temperature control circuit 91 may have the connection path C1 which connects the main body supply path Bin and the main body discharge path Bout for the purpose of releasing some of the heat medium to the main body discharge path Bout and lowering a pressure when the heat medium in the main body supply path Bin exceeds a predetermined pressure.

Also, the matrix supply path Min and the main body supply path Bin partially share routes at a connection portion with the first heating device 91H and are configured to be branched in a middle of the route and to become individual routes. The matrix supply path Min and the main body supply path Bin may be configured to have mutually independent routes within a range in which each function is held or may be configured to partially share routes. The matrix discharge path Mout and the main body discharge path Bout are configured so that individual routes are merged in a middle of the route to become partially shared routes at a connection portion with the first heating device 91H. The matrix discharge path Mout and the main body discharge path Bout may be configured to have mutually independent routes within the range in which each function is held or may be configured to partially share routes.

The matrix supply path Min is branched and connected to the movable side matrix path 24LA and the fixed side matrix path 24LB, and the movable side matrix path 24LA and the fixed side matrix path 24LB are connected to the matrix discharge path Mout. The main body supply path Bin is branched and connected to the movable side main body path 23LA and the fixed side main body path 23LB, and the movable side main body path 23LA and the fixed side main body path 23LB are connected to the main body discharge path Bout. The temperature control or the purging of the matrix 24 is carried out by passing the heat medium or the compressed air through a matrix medium path formed by the matrix supply path Min, the matrix paths 24LA and 24LB and the matrix discharge path Mout. In addition, the temperature control or the purging of the cassette mold main body 23 is carried out by passing the heat medium or the compressed air through a main body medium path formed by the main body supply path Bin, the main body paths 23LA and 23LB and the main body discharge path Bout.

Further, the first temperature control circuit 91 includes a float switch 91F which measures a liquid level of the heat medium temporarily stored in the first heating device 91H. The first heating device 91H includes a first storage tank which temporarily stores the heat medium and a first heater which heats the heat medium in the first storage tank. The first heating device 91H is connected to a heat medium supply source (not illustrated) by a supply path L1in. In a route of the supply path L1in, a supply valve V1 which is a solenoid valve for switching connection and disconnection of the supply path L1in is provided.

The first heating device 91H discharges the surplus heat medium through a discharge path L1out by the float switch 91F. The first temperature control circuit 91 which circulates the heat medium supplies the normal temperature heat medium from the heat medium supply source when the heat medium in the first heating device 91H is lower than a predetermined liquid level and discharges the surplus heat medium through the discharge path L1out when the heat medium in the first heating device 91H is higher than the predetermined liquid level. Further, the first temperature control circuit 91 which circulates the heat medium heats the heat medium in the first heating device 91H with a heater or the like when the heat medium in the first heating device 91H is lower than a predetermined temperature, supplies the normal temperature heat medium from the heat medium supply source when the heat medium in the first heating device 91H is higher than the predetermined temperature, and discharges the surplus heat medium through the discharge path L1out because the heat medium in the first heating device 91H becomes higher than the predetermined liquid level.

Further, the first temperature control circuit 91 includes manual valves VM1, VM2 and VM3 for purging of the matrix 24. The manual valves VM 1 and VM 3 of the matrix 24 are closed to be disconnected when manual purging of the matrix 24 is performed and are open in the other cases. The manual valve VM 2 of the matrix 24 connects the matrix supply path Min with a compressed gas supply device 94P which will be described later when the purging of the matrix 24 is manually performed and is switched in the other cases so that the matrix supply path Min and the first heating device 91H are connected.

The second temperature control circuit 92 includes a second heating device 92H which is controlled by the temperature adjustment control portion 46 and maintains the temporarily stored heat medium at a predetermined cooling temperature or heating temperature, a pump 92P which is controlled by the temperature adjustment control portion 46 to feed the heat medium from the second heating device 92H at a predetermined flow rate, and a core cavity supply path Cin which supplies the heat medium delivered from the second heating device 92H by the pump 92P to the core cavity portion 22. Also, the second temperature control circuit 92 includes a core cavity discharge path Cout which returns the heat medium discharged from the core cavity portion 22 to the second heating device 92H.

The core cavity supply path Cin is branched and connected to the core portion path 22LA and the cavity portion path 22LB, and the core portion path 22LA and the cavity portion path 22LB are connected to the core cavity discharge path Cout. The core cavity portion 22, the core cavity supply path Cin, and the core cavity discharge path Cout are connected to supply the heat medium discharged from the core cavity portion 22 again to the core cavity portion 22, such that the heat medium can circulate. The temperature control or the purging of the core cavity portion 22 is performed by passing the heat medium or the compressed air through a core cavity medium path formed by the core cavity supply path Cin, the core cavity paths 22LA and 22LB and the core cavity discharge path Cout.

Further, the second temperature control circuit 92 may have a connection path C2 which connects the core cavity supply path Cin with the core cavity discharge path Cout for the purpose of releasing some of the heat medium to the core cavity discharge path Cout and lowering a pressure when the heat medium in the core cavity supply path Cin exceeds a predetermined pressure.

The second temperature control circuit 92 includes a float switch 92F which measures a liquid level of the heat medium temporarily stored in the second heating device 92H. The second heating device 92H includes a second storage tank which temporarily stores the heat medium and a second heater which heats the heat medium in the second storage tank. The second heating device 92H is connected to a heat medium supply source (not illustrated) by a supply path L2in. In a route of the supply path L2in, a supply valve V2 which is a solenoid valve for switching connection and disconnection of the supply path L2in is provided.

The second heating device 92H discharges the surplus heat medium through a discharge path L2out by the float switch 92F. The second temperature control circuit 92 which circulates the heat medium supplies the normal temperature heat medium from the heat medium supply source when the heat medium in the second heating device 92H is lower than a predetermined liquid level and discharges the surplus heat medium through the discharge path L2out when the heat medium in the second heating device 92H is higher than the predetermined liquid level. Further, the second temperature control circuit 92 which circulates the heat medium heats the heat medium in the second heating device 92H with a heater or the like when the heat medium in the second heating device 92H is lower than a predetermined temperature, supplies the normal temperature heat medium from the heat medium supply source when the heat medium in the second heating device 92H is higher than the predetermined temperature, and discharges the surplus heat medium through the discharge path L2out because the heat medium in the second heating device 92H becomes higher than the predetermined liquid level.

The bypass circuit 93 includes a bypass path BPin which connects the core cavity supply path Cin with the main body supply path Bin, and a bypass control valve VBP1 which switches connection between the first heating device 91H and the main body supply path Bin and connection between the bypass path BPin and the main body supply path Bin. Further, the bypass circuit 93 includes a bypass path BPout which connects the core cavity discharge path Cout with the main body discharge path Bout, and a bypass control valve VBP2 which switches connection between the first heating device 91H and the main body discharge path Bout and connection between the bypass path BPout and the main body discharge path Bout. Furthermore, the bypass path BPin may be configured to connect the second heating device 92H with the main body supply path Bin. The bypass control valve VBP1 selectively connects either the first heating device 91H, the second heating device 92H or the compressed gas supply device 94P described later to the main body supply path Bin by switching the above-described connection, and thus the heat medium or the compressed air is supplied to the main body supply path Bin.

The bypass control valves VBP1 and VBP2 are three-port solenoid valves. As long as the function of switching the connection between the first heating device 91H and the main body supply path Bin and the connection between the bypass path BPin and the main body supply path Bin can be realized, the bypass control valve VBP1 may be configured with two solenoid valves, and a position thereof in the circuit may be appropriately changed. As long as the function of switching the connection between the first heating device 91H and the main body discharge path Bout and the connection between the bypass path BPout and the main body discharge path Bout can be realized, the bypass control valve VBP2 may be configured with two solenoid valves, and a position thereof in the circuit may be appropriately changed.

The cassette mold purge circuit 94 includes a purge path Pin which supplies the compressed gas to the core cavity supply path Cin and the bypass path BPin, a compressed gas supply device 94P which supplies the compressed gas to the purge path Pin, and a purge control valve VP1 which switches supply of the compressed gas to the core cavity supply path Cin and the bypass path BPin on and off by switching connection between the second heating device 92H and the core cavity supply path Cin and connection between the bypass path BPin and the core cavity supply path Cin. Further, the cassette mold purge circuit 94 may have a purge control valve VP2 which switches of supply of the compressed gas in the purge path Pin to a route of the purge path Pin on and off. Also, in the cassette mold purge circuit 94, a gas supply valve which is a solenoid valve for controlling a supply amount of the gas to the purge path Pin may be provided in the route of the purge path Pin.

In the embodiment, the bypass path BPin and the core cavity supply path Cin are connected, and the purge path Pin is configured to connect the compressed gas supply device 94P and the core cavity supply path Cin at an upstream side of the connection portion between the bypass path BPin and the core cavity supply path Cin. In this case, at the upstream side of the connection portion between the bypass path BPin and the core cavity supply path Cin, when the compressed gas is supplied from the compressed gas supply device 94P to the core cavity supply path Cin, the compressed gas can also be supplied to the bypass path BPin through the core cavity supply path Cin. Further, in this case, a connecting path for supplying the compressed gas from the compressed gas supply device 94P to the core cavity supply path Cin and a part (path from a connection portion between the connecting path for supplying the compressed gas from the compressed gas supply device 94P to the core cavity supply path Cin and the core cavity supply path Cin to a connection portion between the bypass path BPin and the core cavity supply path Cin) of the core cavity supply path Cin forms the purge path Pin. Also, the purge path Pin may be configured to independently have a path which supplies the compressed gas from the compressed gas supply device 94P to the core cavity supply path Cin and a path which supplies the compressed gas from the compressed gas supply device 94P to the bypass path BPin. The purge control valve VP1 is a three-port solenoid valve. As long as the function of switching supply of the compressed gas to the core cavity supply path Cin and the bypass path BPin on and off can be realized, the purge control valve VP1 may be configured with two solenoid valves, and a position thereof in the circuit may be appropriately changed.

Further, it is preferable that a residual pressure releasing valve for releasing a pressure of the gas after the compressed gas passes through at least a part of the mold temperature control circuit 9 be provided along the route in the mold temperature control circuit 9. In FIG. 7, as one example, residual pressure releasing valves VO1, VO2 and VO3 which are solenoid valves are provided at a plurality of places of the mold temperature control circuit. Here, the residual pressure releasing valves VO1, VO2 and VO3 are provided along each of the main body supply path Bin, the main body discharge path Bout and the core cavity discharge path Cout. However, the disclosure is not limited thereto, and an appropriate number of residual pressure releasing valves may be provided at appropriate positions according to demands of an apparatus or the like. Further, a tray or the like is appropriately installed around the residual pressure releasing valves VO1, VO2 and VO3 in preparation for a case in which the remaining heat medium or the like leaks out of a piping after the heat medium of a piping column is purged with the compressed gas.

Figure 8:
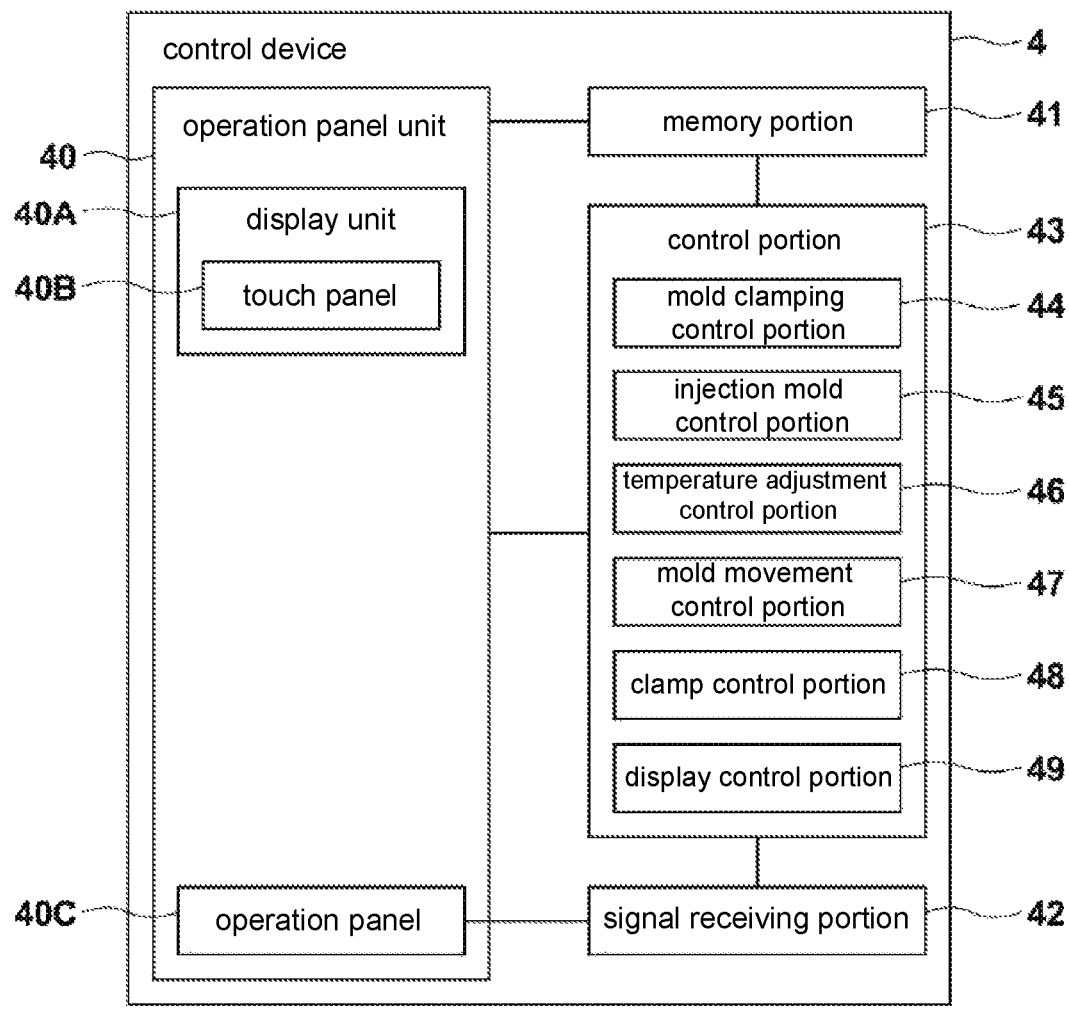
FIG. 8 is a block diagram illustrating a configuration of a control device of FIG. 1.

FIG. 8 is a block diagram illustrating a configuration of the control device 4 in the embodiment of the disclosure.

The control device 4 has an operation panel unit 40 and includes a memory device (memory portion) 41, an arithmetic device including at least one central processing unit (CPU) and a cache memory (secondary cache) mounted on a board, extended random access memory (RAM) inserted into a dedicated slot, and one casing in which accessories such as various interfaces are accommodated.

In addition to basic software such as an operating system, dedicated software which defines a control program of the mold temperature control circuit of the embodiment is installed in the memory device 41. By executing such software with the CPU included in the arithmetic device of the control device 4, the control device 4 realizes each function of a control portion 43.

The operation panel unit 40 includes a display unit 40A and an operation panel 40C on which various operation hard switches such as a power switch (not illustrated) provided below the display unit 40A are provided. The display unit 40A is a liquid crystal display including a touch panel 40B which is provided to cover a screen. A signal receiving portion 42 which receives an input signal when the hard switch of the operation panel 40C is pushed down is provided at the control device 4, and when each signal is received, control is performed according to the signal received by the control portion 43. Hereinafter, the touch panel 40B provided in the display unit 40A will be described as an input portion. Further, the display unit may be connected to the control device 4 wirelessly or by wire if necessary, and conditions may be set by a keyboard or a hard switch instead of the touch panel.

The control portion 43 includes a mold clamping control portion 44 which controls an operation of the mold clamping device 2, an injection molding control portion 45 which controls an operation of the injection device 3, and a temperature adjustment control portion 46 which controls the mold temperature control circuit 9 and controls the temperature of the mold 20. The control portion 43 also includes a mold movement control portion 47 which controls a mold moving means to install and remove the cassette mold 21 at/from the matrix 24, a clamp control portion 48 which drives the clamping means CA and CB and clamps or unclamps the cassette mold 21 to/from the matrix 24, and a display control portion 49 which displays a cassette mold replacement screen 70 having setting conditions necessary for replacement of the cassette mold 21 and buttons for starting each replacement process on the display unit 40A. The display control portion 49 also has a function of displaying a setting screen corresponding to each operation of the injection molding machine 1, such as an injection molding screen for setting conditions of the injection molding process and instructing start of the process and a mold clamping setting screen for setting mold clamping conditions and instructing start of mold opening/closing, on the operation panel unit 40.

The mold clamping control portion 44 controls the driving device 14 of the mold clamping device 2 to advance and retreat the movable platen 11 together with the movable side mold 20A and performs mold closing and mold clamping, the injection molding control portion 45 controls the various driving devices 52, 53 and 64 to meter the molten molding material, the metered molten resin is injected into the mold 20 of which a temperature is controlled to a predetermined temperature lower than the molten resin by the mold temperature control circuit 9, the pressure is held, and cooling is performed until the molten resin is solidified in the mold 20. Finally, when the mold clamping control portion 44 advances and retreats the movable platen 11 together with the movable side mold 20A to open the mold clamping of the mold 20 installed at the mold clamping device 2, the cooled and solidified molded article is removed. In addition, the injection molding control portion 45 also serves as a heating control portion which controls the temperature of the molding material by driving the heater 69, the heater of the hot runner nozzle HR, or the like.

The injection molding control portion 45 reads the actual detection values of the position detection device for sequentially detecting a moved position or speed of the plunger 61 and the pressure detection device for sequentially detecting a pressure applied to the molten resin in the injection chamber 65 by the plunger 61, issues a command to operate according to preset molding conditions and operation procedures while comparing the detection values with the preset molding conditions and the like and thus controls the injection driving device 64.

The injection molding process performed by the injection device 3 will be described. First, as a metering process, the resin material supplied from the hopper 81 is extruded toward an inside of the injection chamber 65 through the communication paths 7a and 62a by rotation of the screw 51 while being plasticized and melted by shear heat generated by the rotation of the screw 51 and heating of the heater 69, and while the molten resin receives a predetermined back pressure by retreating the plunger 61, the molten resin is metered according to a retreated distance of the plunger 61. At this time, the backflow prevention driving device 53 allows the screw 51 to be retreated by the pressure acting on the extruded molten resin and opens an opening of the communication path 7a on the plasticization cylinder 50 side. Next, as a filling process, the plunger 61 advances according to preset filling conditions to fill the molten resin from the injection nozzle 63 toward the molding space in the mold 20. Further, before the filling, the backflow prevention driving device 53 advances the screw 51 to close the opening of the communication path 7a on the plasticization cylinder 50 side, thereby preventing a backflow. Furthermore, to prevent the backflow, the screw 51 may be retreated to close the communication path 7a on the plasticization cylinder 50 side, or a rotary valve or the like may be provided in a middle of the communication paths 7a and 62a to close the communication paths 7a and 62a.

Following the filling process, a pressure holding process is performed. In the pressure holding process, for example, in a state in which the predetermined pressure applied to the molten resin by the plunger 61 is preferentially controlled, the mold 20 is filled with the molten resin corresponding to a shortage including heat shrinkage due to the cooling of the molten resin filled in the mold 20. Further, in the pressure holding process, a pressure is applied to the molten resin in the molding space until the molten resin in a gate portion of the mold 20 adjacent to the molding space is solidified, and thus the backflow is prevented.

The temperature adjustment control portion 46 reads conditions such as temperature and operating procedures preset by an operator's input or the like from the memory device 41 and controls each element such as the first and second temperature control circuits 91 and 92 of the mold temperature control circuit 9, the bypass circuit 93, the purge circuit 94 and so on to operate according to the read conditions and operation procedures. The temperature adjustment control portion 46 performs cassette mold cool down control for performing a cassette mold cool down process, cassette mold purge control for performing a cassette mold purge process, and temperature control of the mold 20.

Figure 9:
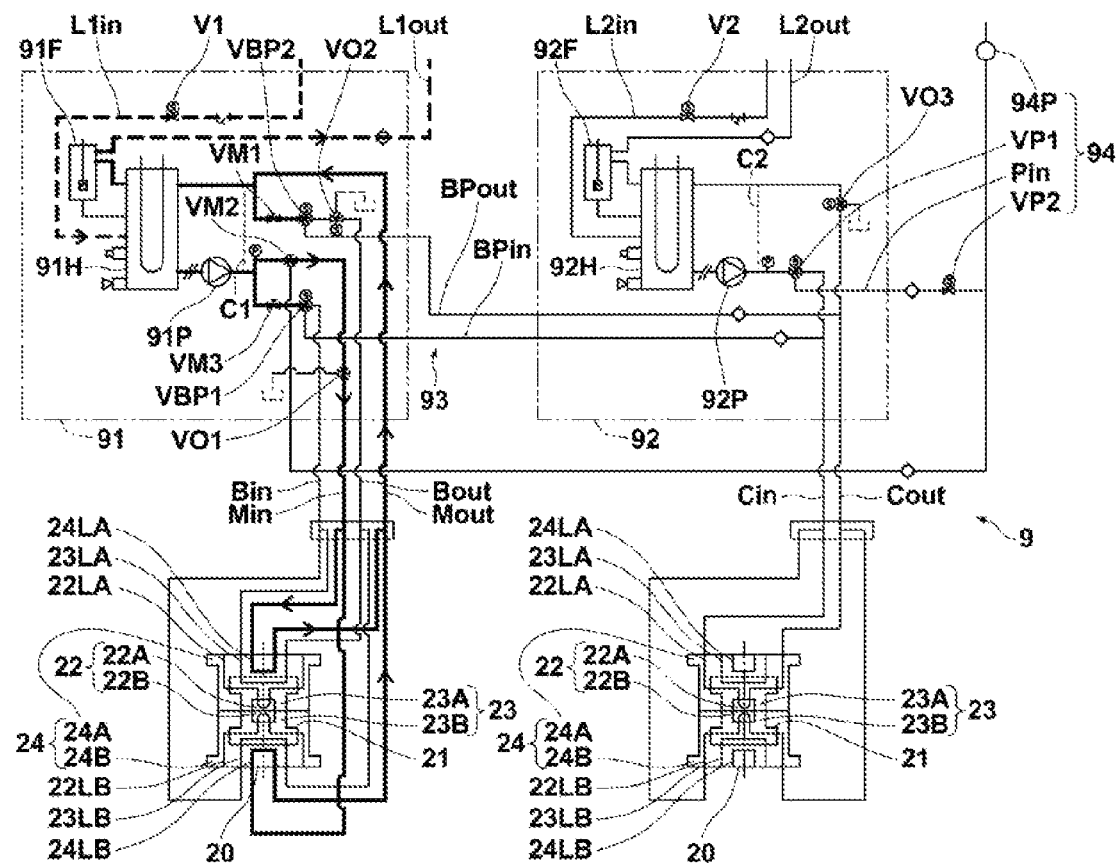
FIG. 9 is a diagram illustrating a route of a heat medium passing through a first heating device of the mold temperature control circuit of FIG. 7.
Figure 10:
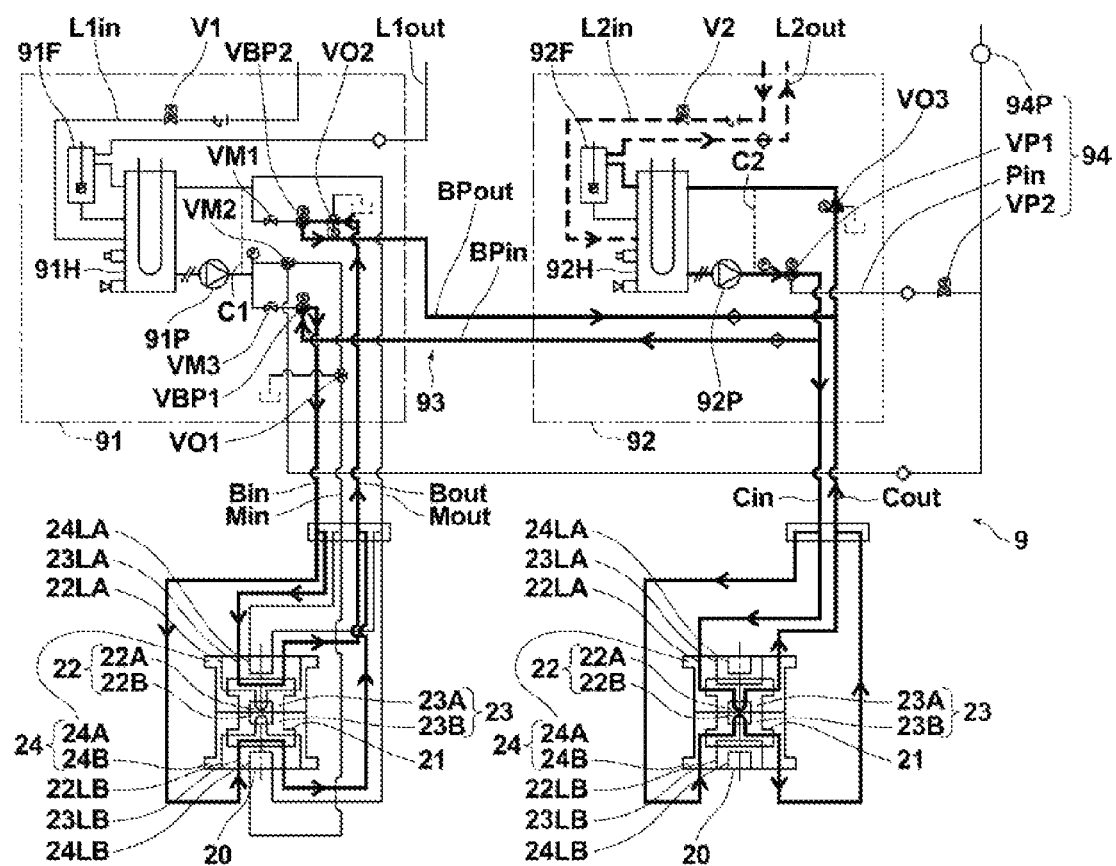
FIG. 10 is a diagram illustrating a route of a cooling medium passing through a second heating device of the mold temperature control circuit of FIG. 7.
Figure 11:
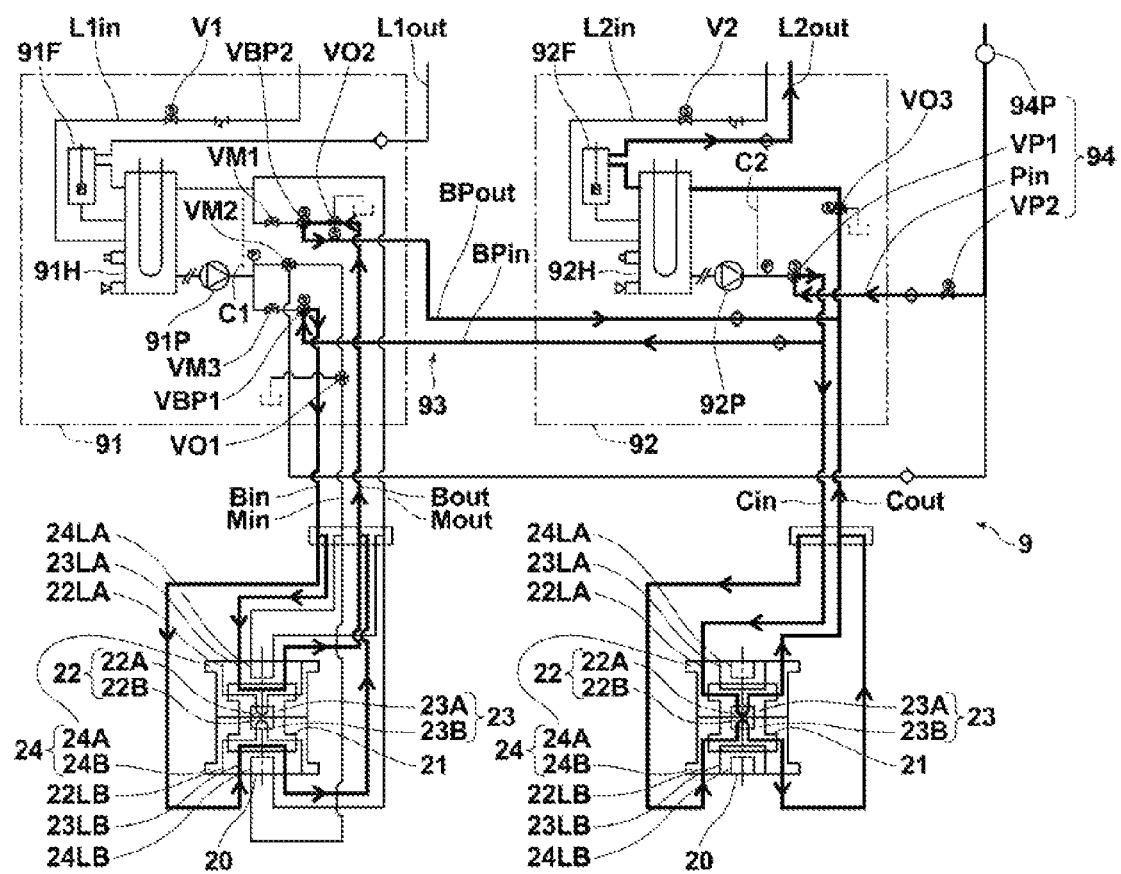
FIG. 11 is a diagram illustrating a route of a compressed gas of the mold temperature control circuit of FIG. 7.

A cool down process and a cassette mold purge process performed by the mold temperature control circuit 9 will be described with reference to FIGS. 9 to 11. In FIGS. 9 to 11, thick lines indicate flows of the heat medium or the compressed gas. FIG. 9 is a diagram illustrating a movement route of the heat medium from the first temperature control circuit 91 in the cassette mold cool down process (hereinafter, cool down process) and the cassette mold purge process.

As illustrated in FIG. 9, in the cool down process, the temperature adjustment control portion 46 controls the first temperature control circuit 91 to supply the heat medium having a heating temperature passing through the first heating device 91H to the matrix supply path Min. The temperature adjustment control portion 46 drives the first heating device 91H and the pump 91P so that a predetermined amount of heat medium having a predetermined temperature circulates in a matrix circulation path formed by the matrix supply path Min, the matrix paths 24LA and 24LB, the matrix discharge path Mout and the first heating device 91H. By such control, the matrix 24 maintains the heating temperature.

FIG. 10 is a diagram illustrating a movement route of the heat medium passing through the second heating device 92H in the cool down process. Also, although not illustrated in FIG. 10, during the cool down process, the temperature adjustment control of the first temperature control circuit 91 illustrated in FIG. 9 is performed in parallel. During the cool down process, the temperature adjustment control portion 46 controls the second temperature control circuit 92 to supply the heat medium having the cooling temperature from the second heating device 92H to the core cavity supply path Cin. The heat medium having the cooling temperature passes through the core cavity paths 22LA and 22LB, then passes through the core cavity discharge path Cout in this order and is returned to the second heating device 92H. By such control, the core cavity portion 22 is cooled.

Further, before the supply of the heat medium having the cooling temperature, the temperature adjustment control portion 46 controls the bypass control valve VBP1 to connect the bypass path BPin and the main body supply path Bin and controls the bypass control valve VBP2 to connect the bypass path BPout and the main body discharge path Bout. Therefore, the heat medium having the cooling temperature flows into the bypass path BPin from the second heating device 92H or the core cavity supply path Cin, passes through the main body paths 23LA and 23LB in the cassette mold main body 23, then passes through the main body discharge path Bout, the bypass path BPout and the core cavity discharge path Cout in this order and is returned to the second heating device 92H. By such control, the cassette mold main body 23 is cooled.

Next, the cassette mold purge process will be described. FIG. 11 is a diagram illustrating a movement route of the compressed gas in the cassette mold purge process. Although not illustrated in FIG. 11, during the cassette mold purge process, the temperature adjustment control of the first temperature control circuit 91 illustrated in FIG. 9 is performed in parallel.

As illustrated in FIG. 11, the temperature adjustment control portion 46 controls the second temperature control circuit 92 to stop the supply of the heat medium from the second heating device 92H.

The temperature adjustment control portion 46 controls the purge circuit 94 to supply the compressed gas to the core cavity supply path Cin and the bypass path BPin. Here, the purge control valve VP1 is controlled so that the connection between the second heating device 92H and the core cavity supply path Cin is switched to the connection between the compressed gas supply device 94P and the core cavity supply path Cin. Therefore, the compressed gas can be supplied from the compressed gas supply device 94P to both of the core cavity supply path Cin and the bypass path BPin connected to the core cavity supply path Cin. Then, the temperature adjustment control portion 46 opens the purge control valve VP2 in a state in which the compressed gas supply device 94P is driven. Accordingly, the compressed gas flows from the compressed gas supply device 94P into the core cavity supply path Cin through the purge path Pin, passes through the core cavity paths 22LA and 22LB and then passes through the core cavity discharge path Cout in this order. By such control, the remaining heat medium in the core cavity portion 22 is returned to the second heating device 92H. Since the remaining heat medium in the core cavity portion 22 is returned, the liquid level of the stored heat medium exceeds the predetermined liquid level, and thus the second heating device 92H discharges the surplus heat medium, which exceeds the predetermined liquid level, to the outside of the mold temperature control circuit 9 through the discharge path L2out.

Further, before the supply of the compressed gas, the temperature adjustment control portion 46 controls the bypass control valve VBP1 to connect the bypass path BPin and the main body supply path Bin and controls the bypass control valve VBP2 to connect the bypass path BPout and the main body discharge path Bout. Therefore, the compressed gas flows from the compressed gas supply device 94P into the bypass path BPin, passes through the main body paths 23LA and 23LB in the cassette mold main body 23 and then passes through the main body discharge path Bout, the bypass path BPout and the core cavity discharge path Cout in this order. By such control, the remaining heat medium in the cassette mold main body 23 is returned to the second heating device 92H. Since the remaining heat medium in the cassette mold main body 23 is returned, the liquid level of the stored heat medium exceeds the predetermined liquid level, and thus the second heating device 92H discharges the surplus heat medium, which exceeds the predetermined liquid level, to the outside of the mold temperature control circuit 9 through the discharge path L2out.

Further, the temperature adjustment control portion 46 stops the supply of the compressed gas from the compressed gas supply device 94P and then opens the residual pressure releasing valve VO2 to release the residual pressure in the cassette mold main body 23. Also, the temperature adjustment control portion 46 stops the supply of the compressed gas from the compressed gas supply device 94P and then opens the residual pressure releasing valve VO3 to release the residual pressure in the core cavity portion 22. By providing the residual pressure releasing valve, the compressed gas may be prevented from being extruded from the piping at an unintended place.

In addition, at the time of the filling and the pressure holding in the injection molding process, the temperature adjustment control portion 46 performs the temperature adjustment control using the first and second temperature control circuits 91 and 92 and the bypass circuit 93 so that the matrix 24 and the cassette mold main body 23 are maintained at a first temperature and the core cavity portion 22 is maintained at a second temperature. Further, the temperature adjustment control portion 46 may control the matrix 24, the cassette mold main body 23 and the core cavity portion 22 to a common temperature, may control the cassette mold main body 23 and the core cavity portion 22 to the second temperature while controlling the matrix 24 to the first temperature and may perform arbitrary temperature control for molding.

Molding temperature adjustment control which maintains the matrix 24 and the cassette mold main body 23 at the first temperature and maintains the core cavity portion 22 at the second temperature will be described. The temperature adjustment control portion 46 switches the bypass control valve VBP1 to the connection between the first heating device 91H and the main body supply path Bin and switches the bypass control valve VBP2 to the connection between the first heating device 91H and the main body discharge path Bout. Additionally, the temperature adjustment control portion 46 drives the pump 91P so that a predetermined amount of heat medium circulates at the first temperature in the matrix circulation path and the cassette mold circulation path according to the setting conditions, and supplies the heat medium from the first heating device 91H to both of the matrix 24 and the cassette mold main body 23. The temperature adjustment control portion 46 drives the pump 92P so that a predetermined amount of heat medium circulates at the second temperature in the core cavity circulation path according to the setting conditions, and supplies the heat medium from the second heating device 92H to the core cavity portion 22. Further, the cassette mold circulation path is formed by the main body supply path Bin, the main body paths 23LA and 23LB, the main body discharge path Bout and the first heating device 91H. The core cavity circulation path is formed by the core cavity supply path Cin, the core cavity paths 22LA and 22LB, the core cavity discharge path Cout and the second heating device 92H.

Further, during the manual purge process of the matrix 24, the operator closes the manual valves VM1 and VM3, switches the manual valve VM2 so that the connection between the first heating device 91H and the matrix supply path Min is switched to the connection between the compressed gas supply device 94P and the matrix supply path Min, and supplies the compressed gas to the matrix supply path Min by driving the compressed gas supply device 94P. Therefore, the compressed gas flows into the matrix paths 24LA and 24LB and passes through the matrix discharge path Mout in order. By such control, the remaining heat medium in the matrix 24 is returned to the first heating device 91H. Since the remaining heat medium in the matrix 24 is returned, the liquid level of the stored heat medium exceeds the predetermined liquid level, and thus the first heating device 91H discharges the surplus heat medium, which exceeds the predetermined liquid level, to the outside of the mold temperature control circuit 9 through the discharge path L1out. Also, during the manual purge process of the matrix 24, the supply of the compressed gas from the compressed gas supply device 94P is stopped, and then the residual pressure releasing valve VO1 of the manual valve is opened to release the residual pressure in the matrix 24. By providing the residual pressure releasing valve, the compressed gas may be prevented from being extruded from the piping at an unintended place.

Figure 12:
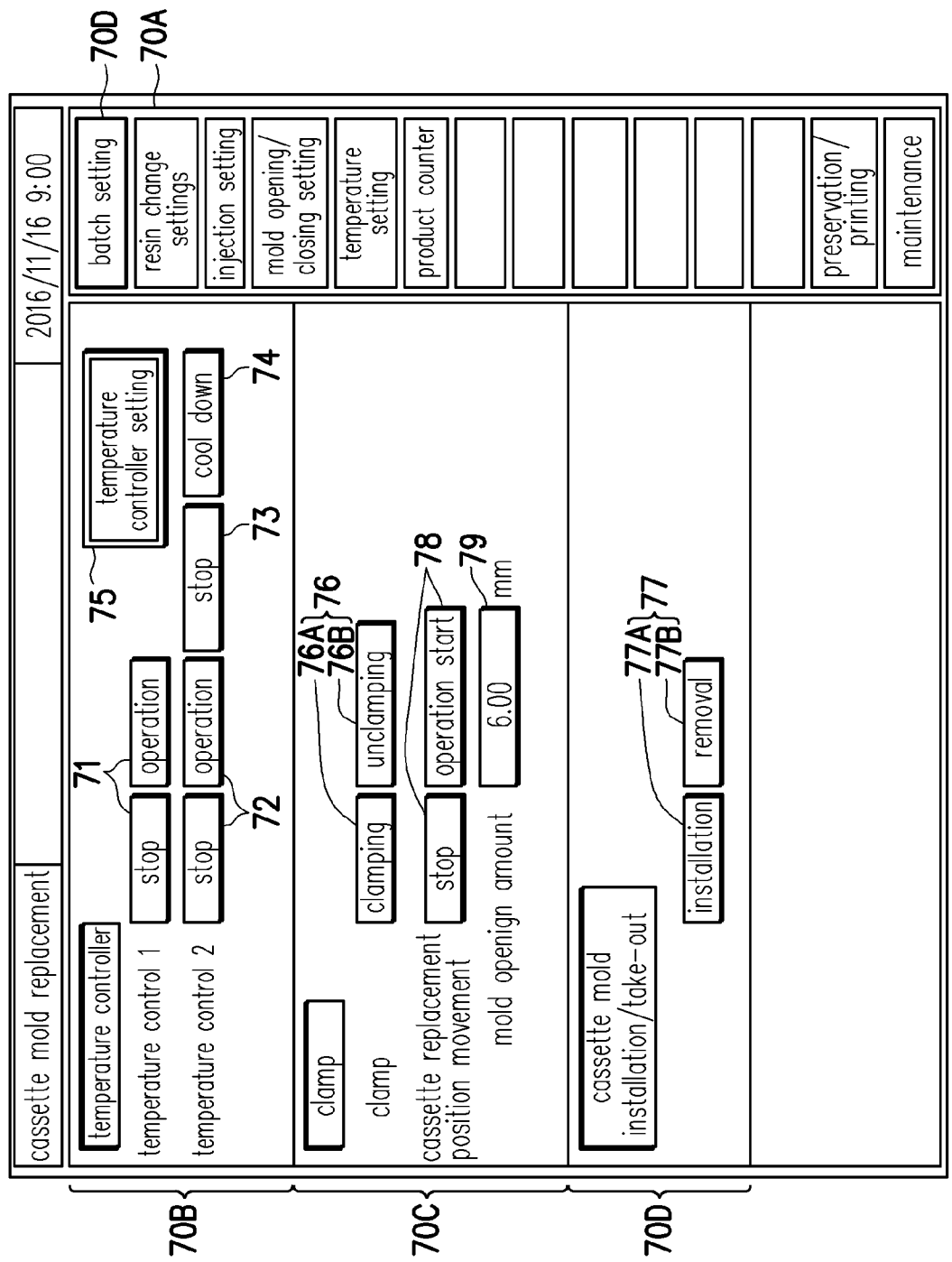
FIG. 12 is a view illustrating an example of a cassette mold replacement screen.
Figure 13:
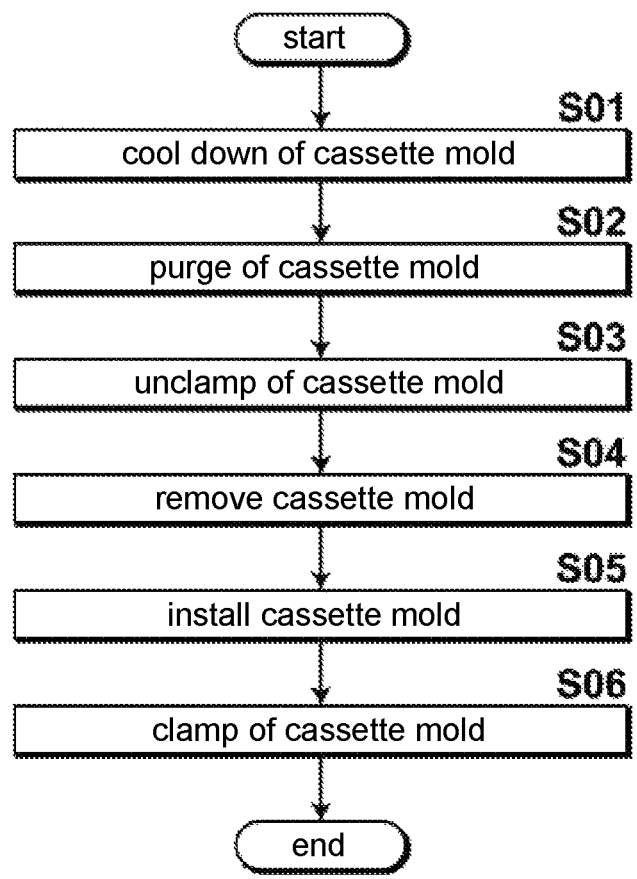
FIG. 13 is a flowchart illustrating a flow of cassette mold replacement.

FIG. 12 illustrates an example of the cassette mold replacement screen 70 displayed on the display unit 40A (display device) of the operation panel unit 40. FIG. 13 is a flowchart illustrating a flow of the cassette mold replacement. Hereinafter, with reference to FIGS. 12 and 13, an operation of the mold replacement in the injection molding machine 1 will be described.

The display control portion 49 causes the display unit 40A to display the cassette mold replacement screen 70 having the setting conditions necessary for replacement of the cassette mold 21 and the buttons for starting each replacement process. The operator turns on a power button of the injection molding machine 1 to switch and display each screen necessary for the desired operation and setting in accordance with a conventional method and then performs setting necessary for the injection molding machine 1 on the screen.

When the operator touches each button on each display screen, the touch panel 40B of the operation panel unit 40 detects a touch panel position which is touched and transmits the touch panel position to the control portion 43. The control portion 43 receives the touch panel position and appropriately transmits an instruction to each portion to perform an operation corresponding to the button on the display screen which corresponds to the touch panel position. When the operator inputs each condition on each display screen, the operation panel unit 40 transmits the touch panel position and input contents to the control portion 43. The control portion 43 receives the touch panel position and the input contents, updates a condition corresponding to the touch panel position according to the input contents and stores it in the memory device 41.

Here, the injection molding machine 1 is in a state after the desired number of injection cycles is performed according to the set conditions, and the mold 20 is installed in the injection molding machine 1 in advance. A display screen (not illustrated) when the injection molding process is finished is displayed on the display unit 40A, and a screen switching button ("batch setting" button) which inputs a display instruction of the cassette mold replacement screen 70 is included in the display screen. The operator can display the cassette mold replacement screen 70 illustrated in FIG. 12 by touching the screen switching button ("batch setting" button) on the operation panel unit 40.

The cassette mold replacement screen 70 includes a switching bar 70A which displays various screen switching buttons, a temperature control column 70B which is an operation column for the mold temperature control circuit 9, a clamp column 70C which is an operation column relating to a clamping operation of the cassette mold 21, and a cassette mold installation and removal column 70D which is an operation column relating to the installation and the removal of the matrix 24 of the cassette mold 21.

The temperature control column 70B includes a purge button 73 (cassette mold purge button) which starts the purging of the cassette mold 21, a cool down button 74 (cassette mold cool down button) which starts the cool down of the cassette mold 21, an operation button 71 which instructs an operation and a stoppage of the first heating device 91H, an operation button 72 which instructs an operation and a stoppage of the second heating device 92H, and a temperature adjustment controller setting button 75 which displays a screen for performing detailed setting of the mold temperature control circuit 9. The clamp column 70C includes a clamp button 76 which includes a clamping button 76A and an unclamping button 76B of the cassette mold 21, an adjustment button 78 which adjusts a replacement position of the cassette mold 21, and a mold opening amount input box 79 which sets a mold opening amount (interval between the movable side matrix and the fixed side matrix) of the matrix 24 at the time of the replacement of the cassette mold 21. The cassette mold installation and removal column 70D has a cassette mold installation and removal button 77 which includes an installation button 77A and a removal button 77B of the cassette mold 21.

In the cassette mold replacement screen 70, only the minimum number of buttons required for the cassette mold replacement may be left, and the remaining buttons may be omitted, or any additional buttons may be added. For example, any one of the operation button 71 of the first heating device 91H, the operation button 72 of the second heating device 92H, the temperature adjustment controller setting button 75, the adjustment button 78, and the mold opening amount input box 79, which is arbitrarily selected, may be omitted. Each operation button in the cassette mold replacement screen may be configured to serve as a plurality of operation buttons with one button. In addition, each operation button may be a plurality of buttons operated according to a predetermined procedure.

When the cool down button 74 is pressed on the cassette mold replacement screen 70, the cassette mold cool down process is performed (S01). The first temperature control circuit 91 maintains the matrix 24 at the heating temperature, the bypass circuit 93 switches the bypass control valve VBP1 and VBP2 to connect the main body supply path Bin and the bypass path BPin and to connect the main body discharge path Bout and the bypass path BPout. The second temperature control circuit 92 supplies the heat medium having the cooling temperature from the second heating device 92H. The heat medium having the cooling temperature is supplied to the core cavity paths 22LA and 22LB and the cassette mold main body paths 23LA and 23LB to cool the core cavity portion 22 and the cassette mold main body 23 and is returned to the second heating device 92H. When the cassette mold main body 23 and the core cavity portion 22 is equal to or less than a predetermined temperature (about 40 degrees or less), the temperature adjustment control portion 46 stops the supply of the heat medium having the cooling temperature of the second temperature control circuit 92 and terminates the cool down process.

Next, when the purge button 73 is pressed on the cassette mold replacement screen 70, the purge process of the cassette mold 21 is performed (S02). The first temperature control circuit 91 maintains the matrix 24 at the heating temperature, and the bypass circuit 93 maintains the connection between the main body supply path Bin and the bypass path BPin and the connection between the main body discharge path Bout and the bypass path BPout. The second temperature control circuit 92 stops the supply of the heat medium having the cooling temperature. The purge circuit 94 switches the purge control valve VP1 to the connection between the purge path Pin and the core cavity supply path Cin and then opens the purge control valve VP2 to supply the compressed gas from the compressed gas supply device 94P to the core cavity portion 22 and the cassette mold main body 23. The compressed gas is supplied to the core cavity paths 22LA and 22LB and the cassette mold main body paths 23LA and 23LB and passes through the core cavity portion 22 and the cassette mold main body 23. By such control, the remaining heat medium in the core cavity portion 22 and the remaining heat medium in the cassette mold main body 23 are returned to the second heating device 91H. Since the remaining heat medium in the core cavity portion 22 and the remaining heat medium in the cassette mold main body 23 are returned, the liquid level of the stored heat medium exceeds the predetermined liquid level, and thus the second heating device 92H discharges the surplus heat medium, which exceeds the predetermined liquid level, to the outside of the mold temperature control circuit 9 through the discharge path L2out of the second temperature control circuit 92. Then, when a sufficient time elapses for the residual medium to be discharged, the compressed gas supply device 94P is stopped, and the residual pressure releasing valve VO2 on the main body discharge path Bout and the residual pressure releasing valve VO3 on the core cavity discharge path Cout are opened to release the residual pressure. The purge circuit 94 switches the purge control valve VP1 to the connection between the second heating device 92H and the core cavity supply path Cin, closes the purge control valve VP2, causes the purge path Pin and the core cavity supply path Cin to be disconnected and terminates the cassette mold purge process.

Next, when a fact that the cassette mold unclamping button 76B is pressed on the cassette mold replacement screen 70 is received, the clamp control portion 48 of the control portion 43 drives the clamping means CA and CB and performs unclamping processes of the movable side cassette mold 21A and the fixed side cassette mold 21B (S03). Therefore, the movable side cassette mold 21A and the fixed side cassette mold 21B are released from the movable side matrix 24A and the fixed side matrix 24B, respectively.

Next, when a fact that the cassette mold removal button 77B is pressed on the cassette mold replacement screen 70 is received, the mold movement control portion 47 of the control portion 43 drives the driving means (not illustrated) and performs the removal process of the cassette mold 21 which moves the cassette mold 21 from the installation position inside the matrix to the replacement position outside the matrix (S04).

The operator removes the cassette mold 21 moved to the replacement position and disposes the new cassette mold 21 at the replacement position. Additionally, when a fact that the cassette mold installation button 77A is pressed on the cassette mold replacement screen 70 is received, the mold movement control portion 47 of the control portion 43 drives the driving means (not illustrated) and performs the installation process of the cassette mold 21 which conveys the cassette mold 21 from the replacement position outside the matrix to the installation position inside the matrix (S05).

Next, when a fact that the cassette mold clamping button 76A is pushed on the cassette mold replacement screen 70 is received, the clamp control portion 48 drives the clamping means CA and CB and performs the clamping process of the cassette mold 21 (S06). Therefore, the movable side cassette mold 21A is held by the movable side matrix 24A, the fixed side cassette mold 21B is held by the fixed side matrix 24B, and the cassette mold replacement is terminated.

According to the above-described injection molding machine 1, the cassette mold cool down control in which the first temperature control circuit 91 is controlled to supply the heat medium having the heating temperature from the first heating device 91H to the matrix supply path Min, the second temperature control circuit 92 is controlled to supply the heat medium having the cooling temperature from the second heating device 92H to the core cavity supply path Cin, and by controlling the bypass control valve VBP1 to connect the bypass path BPin and the main body supply path Bin, the heat medium having the heating temperature is supplied to the matrix 24 and the heat medium having the cooling temperature is supplied to the cassette mold main body 23 and the core cavity portion 22 is performed, and thus it is possible to independently cool the cassette mold 21 having the cassette mold main body 23 and the core cavity portion 22 while maintaining the matrix 24 at the heating temperature. Therefore, it is possible to shorten a time for cooling the cassette mold 21 to a replaceable temperature as compared with a case in which both of the matrix 24 and the cassette mold 21 are cooled. Further, since it is unnecessary to temporarily cool and reheat the matrix 24 at the time of replacing the cassette mold 21, it is possible to save energy and to reduce a time required for heating the mold to a moldable temperature after the replacement of the cassette mold.

Further, as described in the above injection molding machine 1, when it is configured to perform the cassette mold purge control in which the first temperature control circuit 91 is controlled to supply the heat medium having the heating temperature from the first heating device 91H to the matrix supply path Min, the purge circuit 94 is controlled to supply the compressed gas from the compressed gas supply device 94P to the core cavity supply path Cin and the bypass path BPin instead of the heat medium having the cooling temperature or heating temperature from the second heating device 92H, and by controlling the bypass control valve VBP1 to connect the bypass path BPin and the main body supply path Bin, the heat medium having the heating temperature is supplied to the matrix 24 and the compressed gas is supplied to the cassette mold main body 23 and the core cavity portion 22 the cassette mold 21 having the cassette mold main body 23 and the core cavity portion 22 can be independently purged while the matrix 24 is maintained at the heating temperature, and thus it is possible to shorten a time for allowing the cassette mold 21 to be replaceable as compared with a case in which both of the matrix 24 and the cassette mold 21 are purged. Further, since it is unnecessary to temporarily cool and reheat the matrix 24 at the time of replacing the cassette mold 21, it is possible to save the energy and to reduce the time required for heating the mold to the moldable temperature after the replacement of the cassette mold.

Further, since the control of the first temperature control circuit 91 and the bypass circuit 93 in the cassette mold purge process is the same as the control of the first temperature control circuit 91 and the bypass circuit 93 in the cassette mold cool down process, the temperature adjustment control portion 46 does not need to perform new control on the first temperature control circuit 91 and the bypass circuit 93 when the cassette mold purge process is performed subsequently to the cassette mold cool down process, and thus it is possible to further shorten a time required for replacing the cassette mold 21.

Further, the above injection molding machine 1 further includes a display unit 40A (display portion) which displays each operation button corresponding to each operation command including a command for performing the cassette mold purge control and a command for performing the cassette mold cool down control and required at the time of the replacement of the cassette mold on the cassette mold replacement screen 70 which is one input screen, and the operation panel unit 40 (operation device) having the touch panel 40B (touch sensor) which receives a selection input of each of the displayed operation buttons, and the control portion 43 is configured to perform the control according to the operation command corresponding to the operation button which receives the selection operation by the touch sensor, and thus the operation necessary to replace the cassette mold is clearly indicated to the operator, and it is possible to reduce time and labor for switching the screen in consideration of the necessary operation and then searching for the operation button and to make the replacement work easier and shorten.

Further, since the above-described injection molding machine 1 has the mold moving means for moving the cassette mold 21 from the replacement position outside the matrix 24 to the installation position inside the matrix 24 and then installing the cassette mold 21; and moving the cassette mold 21 from the installation position inside the matrix 24 to the replacement position outside the matrix 24 and then removing the cassette mold 21, it is possible to reduce a burden on the operator at the time of the replacement of the cassette mold and to improve operability of the injection molding machine 1. In addition, by reducing the number of operations performed manually, it is possible to shorten the time required to replace the cassette mold.

In the above description, each step S01 to S 06 is performed by sequentially receiving the touching of the operation button by the operator on the cassette mold replacement screen 70. However, a fully automatic replacement button for fully automatically replacing the cassette mold may be provided on the cassette mold replacement screen 70, the control portion 43 may control each portion when the fully automatic replacement button is pressed, and the injection molding machine 1 may automatically perform all of the cassette mold cool down process, the cassette mold purge process, the cassette mold unclamping process, the cassette mold removal process, the cassette mold replacement process, the cassette mold installation process and the cassette mold clamping process. Furthermore, in this case, the injection molding machine 1 may have a mold replacement robot for removing the cassette mold after use from the cassette mold replacement position and then placing a new cassette mold at the cassette mold replacement position, and the control portion 43 may control the mold replacement robot to perform the cassette mold replacement process.

Further, the disclosure is not limited to the above-described embodiment, and it is possible to display buttons for conditions necessary for replacing the cassette mold and start of the operation on a plurality of screens with the condition and operation start buttons being divided. Also, various condition data and setting method thereof can be applied without departing from the gist of the disclosure.

The embodiment was chosen in order to explain the principles of the disclosure and its practical application. Many modifications and variations are possible in light of the above teachings. It is intended that the scope of the disclosure be defined by the claims.

What is claimed is:

1. A cassette mold type injection molding machine which comprises a cassette mold and a matrix in which the cassette mold is removably installed, and the cassette mold performing injection molding using a mold having a core cavity portion configured with a core portion and a cavity portion forming a molding space corresponding to a shape of a desired molded article, and a cassette mold main body which is a portion of the cassette mold other than the core portion and the cavity portion, the cassette mold type injection molding machine comprising:
    a first temperature control circuit having a first heating device which maintains a heat medium at a heating temperature, a matrix supply path which supplies the heat medium having the heating temperature from the first heating device to the matrix when performing injection molding, and a main body supply path which supplies the heat medium having the heating temperature from the first heating device to the cassette mold main body when performing injection molding,
    a second temperature control circuit having a second heating device which maintains the heat medium at a cooling temperature or the heating temperature, and a core cavity supply path which supplies the heat medium from the second heating device to the core cavity portion when performing injection molding,
    a bypass circuit having a bypass path which connects the second heating device or the core cavity supply path with the main body supply path, and a bypass control valve which switches connection between the first heating device when performing injection molding and the main body supply path and connection between the bypass path when replacing the cassette mold and the main body supply path, and
    a control portion configured to control the first temperature control circuit to supply the heat medium having the heating temperature from the first heating device to the matrix supply path, to control the second temperature control circuit to supply the heat medium having the cooling temperature from the second heating device to the core cavity supply path, and to perform cassette mold cool down control in which the bypass control valve is controlled to connect the bypass path and the main body supply path and thus the heat medium having the cooling temperature is supplied to the cassette mold main body and the core cavity portion to cool the cassette mold main body and the core cavity portion while the heat medium having the heating temperature is supplied to the matrix to maintain the matrix at the heating temperature, when replacing the cassette mold,
    wherein the heating temperature is higher than the cooling temperature;
    a matrix path for controlling a temperature of the matrix is formed in the matrix,
    a main body path for controlling a temperature of the cassette mold main body is formed in the cassette mold main body, and
    a core cavity path for controlling a temperature of the core cavity portion is formed in the core cavity portion;
    the matrix path is connected to the matrix supply path;
    the main body path is connected to the main body supply path; and
    the core cavity path is connected to the core cavity supply path.

2. The cassette mold type injection molding machine according to claim 1, further comprising a purge circuit having a purge path which supplies a compressed gas to the core cavity supply path and the bypass path, and a purge control valve which switches supply of the compressed gas to the core cavity supply path and the bypass path on and off,
    wherein the control portion controls the first temperature control circuit to supply the heat medium having the heating temperature from the first heating device to the matrix supply path, controls the purge circuit to supply the compressed gas, instead of the heat medium having the cooling temperature or the heating temperature from the second heating device, to the core cavity supply path and the bypass path, and performs cassette mold purge control in which the bypass control valve is controlled to connect the bypass path and the main body supply path and thus the heat medium having the heating temperature is supplied to the matrix and the compressed gas is supplied to the cassette mold main body and the core cavity portion.

3. The cassette mold type injection molding machine according to claim 2, further comprising an operation device having a display portion configured to display each operation button corresponding to each operation command comprising a command for performing the cassette mold purge control and a command for performing the cassette mold cool down control and required upon replacement of the cassette mold on one input screen and a touch sensor configured to receive an selection input of each displayed operation button, wherein the control portion performs control according to the operation command corresponding to the operation button which receives the selection operation by the touch sensor.

\* \* \* \* \*